US011917687B2

United States Patent
Sahlin et al.

(10) Patent No.: US 11,917,687 B2
(45) Date of Patent: Feb. 27, 2024

(54) RANDOM ACCESS PROCEDURE

(71) Applicant: Telefonaktiebolaget LM Ericsson (publ), Stockholm (SE)

(72) Inventors: Henrik Sahlin, Mölnlycke (SE); Claes Tidestav, Bålsta (SE); Andres Reial, Malmö (SE); Icaro L. J. Da Silva, Solna (SE); Johan Axnäs, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 250 days.

(21) Appl. No.: 16/764,174

(22) PCT Filed: Nov. 9, 2018

(86) PCT No.: PCT/EP2018/080730
§ 371 (c)(1),
(2) Date: May 14, 2020

(87) PCT Pub. No.: WO2019/096679
PCT Pub. Date: May 23, 2019

(65) Prior Publication Data
US 2020/0288503 A1    Sep. 10, 2020

Related U.S. Application Data

(60) Provisional application No. 62/587,231, filed on Nov. 16, 2017.

(51) Int. Cl.
*H04W 74/08* (2009.01)
*H04W 16/28* (2009.01)
*H04W 72/04* (2023.01)

(52) U.S. Cl.
CPC ....... *H04W 74/0833* (2013.01); *H04W 16/28* (2013.01); *H04W 72/04* (2013.01)

(58) Field of Classification Search
None
See application file for complete search history.

(56) References Cited

U.S. PATENT DOCUMENTS

| 2009/0232067 A1* | 9/2009 | Pajukoski | ......... H04W 72/0446 |
| | | | 370/329 |
| 2014/0146863 A1* | 5/2014 | Seol | ..................... H04B 7/0617 |
| | | | 375/224 |

(Continued)

OTHER PUBLICATIONS

PCT International Search Report and Written Opinion dated Jan. 24, 2019 for International Application No. PCT/EP2018/080730, 9 pages.

(Continued)

*Primary Examiner* — Noel R Beharry
*Assistant Examiner* — Rodrick Mak
(74) *Attorney, Agent, or Firm* — Sage Patent Group

(57) ABSTRACT

According to certain embodiments, a method performed by a wireless device comprises initiating a random access procedure in which the wireless device sends a Physical Random Access Channel, PRACH, preamble to a network node and applying a receiver configuration for receiving an access response. The receiver configuration is determined based at least in part on whether a many-to-one association exists between (a) a downlink signal that can be used for beam selection prior to initiating the random access procedure, and (b) PRACH preamble indices.

18 Claims, 24 Drawing Sheets

(56) References Cited

U.S. PATENT DOCUMENTS

| | | | |
|---|---|---|---|
| 2015/0016312 A1* | 1/2015 | Li | H04W 74/006 |
| | | | 370/280 |
| 2018/0212659 A1* | 7/2018 | Xiong | H04W 72/046 |
| 2018/0324865 A1* | 11/2018 | Hui | H04W 74/006 |
| 2019/0037605 A1* | 1/2019 | Agiwal | H04W 24/10 |
| 2019/0053288 A1* | 2/2019 | Zhou | H04W 74/006 |
| 2019/0110314 A1* | 4/2019 | Abedini | H04L 5/0078 |
| 2019/0261157 A1* | 8/2019 | Ramle | H04W 8/06 |
| 2020/0008247 A1* | 1/2020 | Kwak | H04W 74/004 |
| 2020/0154421 A1* | 5/2020 | Niu | H04W 72/042 |
| 2020/0314721 A1* | 10/2020 | Cheng | H04W 36/0058 |
| 2020/0314909 A1* | 10/2020 | Irukulapati | H04W 56/0045 |
| 2020/0374960 A1* | 11/2020 | Deenoo | H04W 72/14 |
| 2021/0136823 A1* | 5/2021 | Kim | H04W 74/0891 |

OTHER PUBLICATIONS

Ericsson, "Remaining details on RACH procedure", 3GPP TSG RAN WG1 Meeting #90bis, R1-1718716, Prague Czechia, Oct. 9-13, 2017, Published Oct. 3, 2017, 21 Pages.

Qualcomm, "Summary of Remaining details on RACH procedure", 3GPP TSG RAN WG1 Meeting 90bis, R1-1719197, Prague Czechia, Oct. 9-13, 2017, Published Oct. 17, 2017, 29 Pages.

\* cited by examiner

Table 1. UE Processing Time and HARQ Timing (Capability #1)

| Confirguration | HARQ Timing Parameter | Units | 15 Khz SCS | 30 Khz SCS | 60 Khz SCS | 120 Khz SCS |
|---|---|---|---|---|---|---|
| Front-loaded DMRS only | N1 | Symbols | [8] | [10] | [14] | [14-21] |
| Front-loaded + additional DMRS | N1 | Symbols | [13] | [13] | [17] | [21] |
| Frequency-first RE-mapping | N2 | Symbols | [9] | [11] | [17] | [31] |

FIGURE 25

Table 2. UE Processing Time and HARQ Timing (Capability #2)

| Confirguration | HARQ Timing Parameter | Units | 15 KHz SCS | 30 Khz SCS |
|---|---|---|---|---|
| Front-loaded DMRS only | N1 | Symbols | [2.5-4] | [2.5-6] |
| Front-loaded + additional DMRS | N1 | Symbols | [12] | [12] |
| Frequency-first RE-manning | N2 | Symbols | [2.5-4] | [2.5-6] |

FIGURE 26

Table 3. Granularity of [12] bits TA command

| Subcarrier Spacing (kHz) of the first uplink transmisson after RAR | Unit |
|---|---|
| 15 | 16*64 Ts |
| 30 | 8*64 Ts |
| 60 | 4*64 Ts |
| 120 | 2*64 Ts |

Note: $Ts = 1/(64 * 30.72 * 10^6)$ seconds

FIGURE 27

RANDOM ACCESS PROCEDURE

CROSS-REFERENCE TO RELATED APPLICATIONS

This application is a 35 U.S.C § 371 national stage application for International Application No. PCT/EP2018/080730, entitled "Random Access Procedure", filed on Nov. 9, 2018, which claims priority to U.S. Provisional Patent Application No. 62/587,231, filed on Nov. 16, 2017, the disclosures and contents of which are hereby incorporated by reference in their entireties.

TECHNICAL FIELD

Certain embodiments relate, in general, to wireless communications and, more particularly, to a random access procedure.

BACKGROUND

Beam Based

The carrier frequency for an anticipated 5G system could be much higher than current 3G and 4G systems. Values in the range of 10-80 GHz have been discussed. At these high frequencies, it is suitable to use an array antenna to achieve beamforming gain. Since the wavelength is less than 3 cm, an array antenna with a large number of antenna elements can be fit into an antenna enclosure with a size comparable to 3G and 4G base station antennas of today. To achieve a reasonable link budget, a typical example of a total antenna array size is comparable to an A4 sheet of paper.

The beams are typically highly directive and give beamforming gains of 20 dB or more since so many antenna elements participate in forming a beam. This means that each beam is relatively narrow in angle, a half-power beam width (HPBW) of 5 degrees is not unlikely. Hence, a sector of a base station must be covered with a large number of beams.

Random Access Procedure

A random access (RA) procedure is a key function in a cellular system. In Long Term Evolution (LTE), a user equipment (UE) which requires access to the network initiates the random access procedure by transmitting a preamble (Msg1) in the uplink on the Physical Random Access Channel (PRACH). A Transmission and Reception Point (TRP) (e.g., gNB, base station, access node) receiving the preamble and detecting the random-access attempt will respond in the downlink by transmitting an access response (e.g., RAR, Msg2). The RAR carries an uplink scheduling grant for the UE to continue the procedure by transmitting a subsequent message in the uplink (Msg3) for terminal identification. A similar procedure is envisioned for New Radio (NR), as illustrated in FIG. 1 (example of an initial access procedure for use in NR).

Before transmission of the PRACH preamble, the UE receives one or several Synchronization Signals transmitted in the downlink. Examples of Synchronization Signals (SS) include primary synchronization signal (PSS), NR-PSS, secondary synchronization signal (SSS), NR-SSS, and channel state information reference signal (CSI-RS). Before transmission of the PRACH preamble, the UE also receives configuration parameters. The configuration parameters may be received on a broadcast channel, such as a physical broadcast channel (PBCH) or NR-PBCH, or via a radio resource control (RRC) message sent via dedicated signaling, such as in a handover command that contains the RACH/PRACH configuration (i.e., RRCConnectionReconfiguration with mobilityControlInfo, see for example 3GPP TS 36.331 V14.4.0 (2017 September)). A synchronization signal block (SSB) may comprise a combination of PSS, SSS and PBCH. The information in PBCH is complemented by configuration parameters, such as, Remaining Minimum System Information (RMSI) and Other System Information (OSI), received on other channels.

If the gNB can identify which SS-block beamforming is best for the UE, then the same beamforming can be used for transmitting RAR and subsequent downlink (DL) transmissions. This is especially useful when the RAR beamforming cannot be based on reciprocity from NR-RACH preamble reception. Systems based on frequency division duplex (FDD) and scenarios with high interference levels are two examples in which a notification of best SS-block to gNB can be useful. With beamformed SS-block and an association between the best received SS-block and a set of NR-RACH preamble indices, the gNB receiving the NR-RACH preamble is informed about the best received SS-block at the UE. That knowledge also allows the gNB to configure CSI-RS resources for beam management procedures.

In the third generation partnership project (3GPP), a PRACH transmission occasion is defined as the time-frequency resource on which a PRACH can be transmitted. A PRACH occasion might be defined that is common for several SS (NR-PSS and NR-SSS). FIG. 2 illustrates an example of a relation between synchronization signals (SS), master information block (MIB), and PRACH resources, with dynamic timing between SS and PRACH. Here an association is defined between each SSB and set of PRACH preamble indices, where the different PRACH preamble indices might be distinguished by different cyclic shifts, root sequences, time allocations, and frequency allocations.

With a one-to-one association between SSB index and PRACH preambles, then one SSB index is associated with each set of PRACH preamble indices. With a many-to-one mapping between SSB and PRACH preambles, then several SSBs are associated with the same set of RACH preamble indices. This is also referred to as "overlapping subsets." If many SSBs are mapped to one RACH transmission occasion, NR may support a mapping from different SSBs to non-overlapping subsets of RACH preamble indices within one RACH transmission occasion.

Quasi Co-Location (QCL)

The concept of QCL can be used to indicate relations between antenna ports used for transmitting different signals with regard to different physical characteristics, such as average delay, delay spread, Doppler spread, Doppler shift, and/or spatial properties. When referring to the spatial properties, the term spatial QCL is used. Spatial QCL was introduced to handle the case where the UE has analog beamforming, and several antenna panels. The UE may use spatial QCL information to adjust its receive beams. This can be very useful, for example, in the receiver processing in the UE. The RAR should be QCL with the SSB selected by the UE. A UE may assume that the demodulation reference signal (DMRS) of the physical downlink control channel (PDCCH) and the DMRS of the physical downlink shared channel (PDSCH) conveying Msg2 are quasi co-located with the SS block that the UE selected for RACH association and transmission.

Silent Nodes

Some nodes (gNBs) in the network might not transmit synchronization and broadcast signals in order to save energy and reduce interference. This does not exclude such a node from being used for communication with a UE, for example, after a handover or as a result of a random access request from an idle or inactive UE, provided that the node's PRACH configuration is aligned with the one announced in the system information broadcast/transmitted (by another node) in the node's coverage area. This reduction in transmitted signals might be done temporarily during low traffic hours or as a static configuration. These nodes are sometimes referred to as "silent nodes." FIG. 3 illustrates an example of a silent node (node A) and a node transmitting SS (node B). As soon as the network is aware of a UE, it might activate such a silent node for receiving and transmitting. This silent node might also be actively receiving the PRACH preamble during time and frequency intervals as configured by other nodes in the network. As soon as this silent node detects a PRACH preamble it can be active and transmit RAR. This is very beneficial if the silent node has a better link budget to the UE than other nodes in the network, or if other nodes accessible to the UE experience higher load.

In the previous paragraph, "inactive" refers to the yet to be named new state planned in 3GPP for NR, wherein the UE's state information (i.e., context) remains in the UE's latest gNB and the connection between the gNB and the core network pertaining to that UE (e.g., the s1 connection) is also kept, whereas the UE's behavior will be more similar to that of RRC_IDLE state than RRC_CONNECTED state.

Single Frequency Network (SFN) Transmission and Heterogeneous Networks

When several radio access nodes (or access points) located in the same area (possibly with fully or partly overlapping coverage areas) have different transmit powers, the deployment is referred to as a heterogeneous network, or HetNet, an example of which is illustrated in FIG. 4. Several nodes in a tightly synchronized heterogeneous network might transmit the same synchronization signals (SS) in a Single Frequency Network (SFN) fashion. This is transparent for the UE in the sense that the UE is unaware that several nodes are included in these transmissions. Although the previous example describes SFN transmission in a heterogeneous network, SFN is not limited to heterogeneous networks.

The UE may transmit PRACH preambles in relation to received SS power and in the direction in which it receives SS. In a heterogeneous network, the UE may receive a stronger signal from a high power node than from a low power node, while the UE might have a better link budget in uplink (it is physically closer) to the low power node than to the high power node.

SUMMARY

There currently exist certain challenge(s). For example, with a many-to-one association between SSB and PRACH preambles, the gNB cannot determine which SSB index was regarded as best received at the UE only from the received PRACH preamble. Instead the gNB only knows the set of SSB indices which are associated with the same set of PRACH preamble indices.

When the gNB has beam correspondence, it may determine the transmission beam to be used for RAR from the direction of the received PRACH preamble. Here, the gNB estimates best beamforming when receiving the PRACH preamble, and the gNB transmits the RAR in a beam corresponding to the received PRACH preamble beam. However, nothing prevents the UE from transmitting the PRACH preamble with another beamforming as compared to when receiving the SSB. As an example, FIG. 5 illustrates several SSBs (A) from the gNB and one PRACH preamble (B) from the UE. In FIG. 5, the gNB transmits four SSBs with different beamforming configurations. As an example, the UE may receive SSB number 2 as the best. However, the beamformer that the UE uses to transmit the PRACH preamble (B) differs from the beamformer that the UE uses to receive SSB number 2. This can occur, for example, if the UE lacks reciprocity ability and is therefore not capable of reusing the identified receiver beamforming in transmitter beamforming. The UE might even use different antennas for receiving and transmitting. In the example of FIG. 5, the transmitted PRACH preamble is reflected in the physical environment between UE and gNB such that the PRACH preamble arrives at the gNB from a direction that is different than the direction to the UE. With a many-to-one mapping between SSBs and PRACH preamble, the gNB doesn't know which of the SSBs (1-4) was the best for the UE. Thus, the gNB cannot transmit the RAR in a way so that it is received as spatially QCL with the SS block that the UE selected for RACH association and transmission.

For silent node deployments and within heterogeneous networks, best performance may be achieved if the access node detecting the PRACH preamble and then transmitting RAR is not required to be the same access node that transmitted the SSB. However, the SSB-RAR QCL assumption would lead to the situation where the UE and the network miss the opportunity to utilize the access node that would have provided the most efficient conditions for communication—if the UE expects the RAR in the same beamforming as received best SSB, the UE might not be able to detect the RAR arriving from other directions.

Certain aspects of the present disclosure and their embodiments may provide solutions to these or other challenges. According to certain embodiments, a wireless device (e.g., UE) is configured to use either a one-to-one or a many-to-one association between the selected SSB and PRACH preamble indices. If the wireless device is configured to use a one-to-one mapping, the wireless device may assume that the RAR is spatially QCL with the selected SSB. If the wireless device is configured to use a many-to-one mapping, the wireless device may not assume that the RAR is spatially QCL with the selected SSB. In the latter scenario, as a special case, the wireless device may instead assume that the RAR can be received from the same direction(s) where it transmitted the PRACH.

There are, proposed herein, various embodiments which address one or more of the issues disclosed herein. In certain embodiments a network node (e.g., gNB) configures the wireless device (e.g., UE) with the use of many-to-one associations between SSB and PRACH preamble indices. The wireless device configures its QCL assumptions between SSB and RAR depending on this configuration. This may be used to maximize the probability that a RAR from a silent node is received by the wireless device.

According to certain embodiments, a method performed by a wireless device comprises initiating a random access procedure in which the wireless device sends a Physical Random Access Channel (PRACH) preamble to a network node and applying a receiver configuration for receiving an access response. The receiver configuration is determined based at least in part on whether a many-to-one association exists between (a) a downlink signal that can be used for beam selection prior to initiating the random access procedure, and (b) PRACH preamble indices.

According to certain embodiments, a wireless device comprises power supply circuitry configured to supply power to the wireless device. The wireless device also comprises processing circuitry. The processing circuitry is configured to initiate a random access procedure in which the wireless device sends a Physical Random Access Channel (PRACH) preamble to a network node. The processing circuitry is also configured to apply a receiver configuration for receiving an access response. The receiver configuration is determined based at least in part on whether a many-to-one association exists between (a) a downlink signal that, prior to initiating the random access procedure, can be used for beam selection, and (b) PRACH preamble indices.

The above-described wireless device and/or method performed by a wireless device may include one or more additional features, such as any one or more of the following:

In certain embodiments, the downlink signal that can be used for beam selection comprises a Synchronization Signal Block (SSB).

In certain embodiments, the downlink signal that can be used for beam selection comprises a Channel State Information-Reference Signal (CSI-RS).

In certain embodiments, when a one-to-one association exists between the downlink signal and the PRACH preamble indices, the receiver configuration assumes quasi co-location between the downlink signal and the access response.

In certain embodiments, when the many-to-one association exists between the downlink signal and the PRACH preamble indices, the receiver configuration does not assume quasi co-location between the downlink signal and the access response. In certain embodiments, the receiver configuration that does not assume quasi co-location between the downlink signal and the access response uses beam scanning to detect the access response. In certain embodiments, the receiver configuration that does not assume quasi co-location between the downlink signal and the access response uses a wider beam for the reception of the access response compared to the receiver configuration that assumes quasi co-location between the downlink signal and the access response.

In certain embodiments, when the many-to-one association exists between the downlink signal and the PRACH preamble indices, the receiver configuration is determined based on assuming a spatial correspondence between the access response and the PRACH preamble sent during the random access procedure.

In certain embodiments, the determination whether the many-to-one association exists is based on broadcast information received from the network while the wireless device is idle or inactive.

In certain embodiments, the determination whether the many-to-one association exists is based on dedicated signaling received from the network while the wireless device is connected. For example, the dedicated signaling can be received via radio resource control (RRC) signaling, such a release message or handover command received via RRC signaling.

In certain embodiments, receive weights for receiving the access response are configured to be the same as receive weights used for receiving the downlink signal on a preferred beam based on the downlink signal and the PRACH preamble indices having a one-to-one association.

In certain embodiments, receive weights for receiving the access response are configured to be different than receive weights used for receiving the downlink signal on a preferred beam based the downlink signal and the PRACH preamble indices having the many-to-one association.

According to certain embodiments, a method performed by a network node comprises transmitting information to a wireless device. The information indicates whether a many-to-one association exists between (a) a downlink signal that the wireless device can use for beam selection prior to a random access procedure, and (b) PRACH preamble indices. The method further comprises transmitting one or more of the downlink signals that the wireless device can use for beam selection prior to the random access procedure. The method further comprises receiving a PRACH preamble from the wireless device and applying a transmitter configuration for transmitting an access response to the received PRACH preamble. The transmitter configuration is based at least in part on whether a many-to-one association exists and on the received PRACH preamble.

According to certain embodiments, a base station comprises power supply circuitry configured to supply power to the base station. The base station also comprises processing circuitry. The processing circuitry is configured to transmit information to the wireless device. The information indicates whether a many-to-one association exists between (a) a downlink signal that the wireless device can use for beam selection prior to a random access procedure, and (b) PRACH preamble indices. The processing circuitry is further configured to transmit one or more of the downlink signals that the wireless device can use for beam selection prior to the random access procedure. The processing circuitry is further configured to receive a PRACH preamble from the wireless device and apply a transmitter configuration for transmitting an access response to the received PRACH preamble. The transmitter configuration is based at least in part on whether a many-to-one association exists and on the received PRACH preamble.

The above-described wireless device and/or method performed by a wireless device may include one or more additional features, such as any one or more of the following:

In certain embodiments, the downlink signal that can be used for beam selection comprises a Synchronization Signal Block (SSB).

In certain embodiments, the downlink signal that can be used for beam selection comprises a Channel State Information-Reference Signal (CSI-RS).

In certain embodiments, when a one-to-one association exists between the downlink signal and the PRACH preamble indices, the transmitter configuration applies quasi co-location to the downlink signal and the access response.

In certain embodiments, when the many-to-one association exists between the downlink signal and the PRACH preamble indices, the transmitter configuration does not apply quasi co-location between the downlink signal and the access response.

In certain embodiments, the transmitter configuration that does not apply quasi co-location between the downlink signal and the access response uses beam sweeping over all beams that map to the received PRACH preamble.

In certain embodiments, when the many-to-one association exists between the downlink signal and the PRACH preamble indices, the transmitter configuration transmits with spatial correspondence between the access response and the received PRACH preamble.

In certain embodiments, the information is sent to the wireless device via broadcast messaging.

In certain embodiments, the information is sent to the wireless device via dedicated signaling. For example, the dedicated signaling can be sent via radio resource control (RRC) signaling, such as a release message or handover command sent to the wireless device via RRC signaling.

In certain embodiments, when the many-to-one association exists, a beam different from any of the beams that map to the received PRACH is used for transmitting the access response. In some embodiments, the different beam comprises a wide, cell-covering, or approximately isotropic beam.

In certain embodiments, the information transmitted to the wireless device indicates the many-to-one association exists between the downlink signal and the PRACH preamble indices (e.g., which may cause the wireless device not to assume QCL between the downlink signal and the access response), but the downlink signal is actually transmitted according to a one-to-one association with the PRACH preamble indices.

In certain embodiments, the transmitter is configured to use transmission (TX) precoding weights when transmitting the access response. As an example, in some embodiments, the transmitter is configured to use TX precoding weights that were applied for transmitting the downlink signal indicated by the received PRACH preamble resources if the mapping between the downlink signal and the PRACH preamble indices comprises a one-to-one association. As another example, in some embodiments, the transmitter is configured to use TX precoding weights that focus the access response energy in the direction of the PRACH reception if the mapping between the downlink signal and the PRACH preamble indices comprises the many-to-one association.

According to certain embodiments, a method for RAR reception at a wireless device comprises receiving SSB-RAR mapping configuration information, receiving one or more SSBs from a network, determining a preferred SSB based on SSB reception, determining a PRACH resource based on the configuration information, transmitting a PRACH preamble using the PRACH resource, applying a RAR receiver configuration based on the configuration information, and receiving RAR using the RAR receiver configuration. In certain embodiments, applying the RAR receiver configuration comprises configuring the receiver to use receiver/reception (RX) weights that are optimal for the preferred SSB reception if the SSB-RAR mapping configuration information indicates one-to-one mapping, or configuring the receiver to use RX weights that differ from the optimal weights for the preferred SSB reception if the SSB-RAR mapping configuration information indicates many-to-one mapping.

According to certain embodiments, a method for RAR transmission at a network node comprises transmitting SSB-RAR mapping configuration information, transmitting two or more SSBs, receiving a PRACH preamble from a UE, applying a RAR transmitter configuration based on the received PRACH preamble signal and the configuration information, and transmitting RAR using the RAR transmitter configuration. In certain embodiments, applying the RAR transmitter configuration comprises configuring the transmitter to use transmitter/transmission (TX) precoding weights that were applied for transmitting the SSB indicated by the received PRACH preamble resources if the SSB-RAR mapping configuration information indicates one-to-one mapping, or configuring the receiver to use TX precoding weights that focus the RAR energy in the direction of the PRACH reception if the SSB-RAR mapping configuration information indicates many-to-one mapping.

Certain embodiments may provide one or more of the following technical advantage(s). A technical advantage of some embodiments includes enabling the network node (e.g., gNB) to transmit the RAR in another beam than the related SSB, and it allows the network to define the gNB behavior for the case of many-to-one associations between SSB and PRACH preamble indices. Another technical advantage of some embodiments includes enabling the use of "silent nodes" for PRACH detection and RAR transmission in an NR network. This is enabled by configuring a many-to-one association between SSB and PRACH preamble indices, for which any access point can send the RAR and not only access points transmitting SSBs. It also improves detection performance in heterogeneous networks.

BRIEF DESCRIPTION

FIG. 25 illustrates a table related to a baseline UE processing time capability in NR Release 15, in accordance with some embodiments.

FIG. 26 illustrates a table related to aggressive UE processing time capability in NR Release 15, in accordance with some embodiments.

FIG. 27 illustrates is a table regarding contents of Timing Advance (TA), in accordance with some embodiments.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 6:
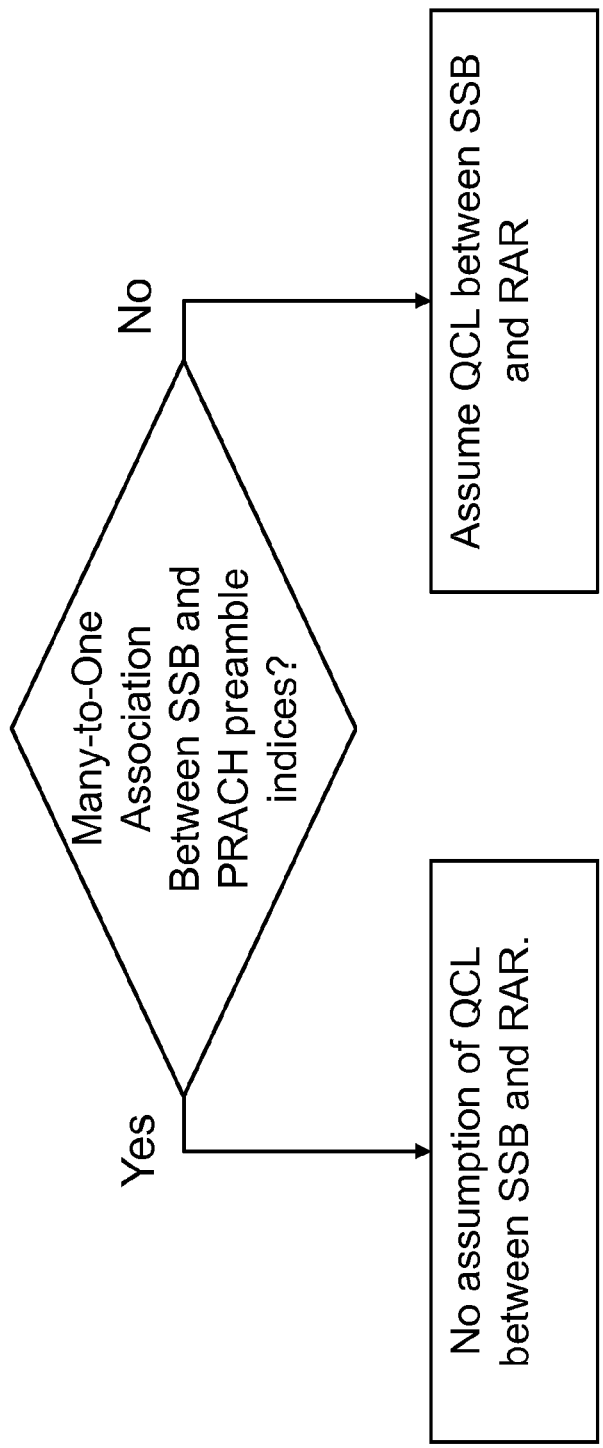
FIG. 6 illustrates an example of illustrates an example of a method performed by a wireless device, in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document provided in the Appendix. FIG. 6 illustrates an example of wireless device behavior according to one embodiment. In FIG. 6, a determination is made whether a many-to-one association exists between SSB and PRACH preamble indices. If the many-to-one association does not exist between SSB and PRACH preamble indices (see "no" side in FIG. 6), the wireless device may consider the RAR as spatially QCL with the selected SSB. The wireless device that has determined a preferred set of receiver (RX) combining weights for SSB reception can reuse the same weights for RAR demodulation. This means that for a one-to-one association of SSB and PRACH preamble index, the RAR will be received from the same (spatially QCL) direction/beamformed transmission as the SSB.

When a many-to-one association exists between SSB and PRACH preamble indices (see "yes" side in FIG. 6), the wireless device may not make any assumption about spatial QCL between SSB and RAR. This means that the RAR may be received from any (spatial) direction/beamformed transmission compared to the SSB in which the PRACH preamble was received. When the wireless device is not assuming QCL between SSB and RAR, then the wireless device will monitor a wider range of receiver directions for RAR, not just the selected SSB direction. The wireless device may, for example, perform RX beam scanning as part of the RAR reception procedure. Alternatively, the wireless device may use a wider beam in the reception of RAR compared to the above case assuming spatial QCL between SSB and RAR.

Figure 7:
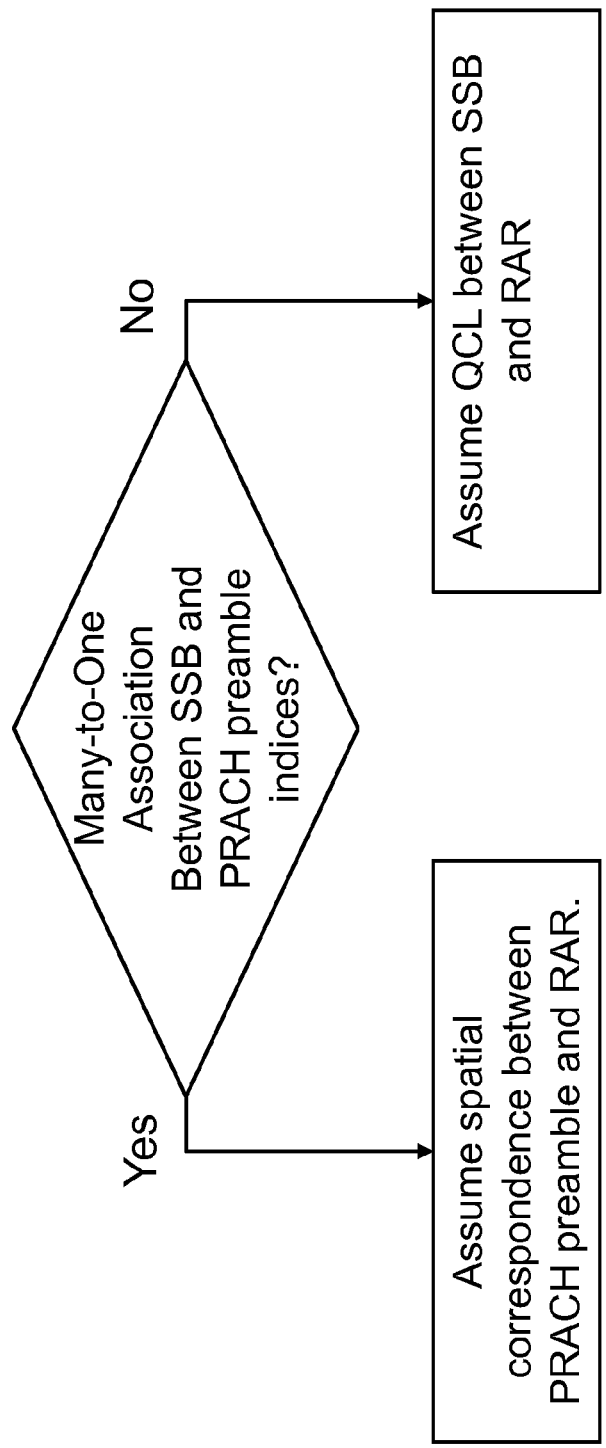
FIG. 7 illustrates an example of a method performed by a wireless device, in accordance with some embodiments.

FIG. 7 illustrates another example of wireless device behavior. In one embodiment, when a many-to-one association exists between SSB and PRACH preamble indices (see "yes" side of FIG. 7), then it may assume a spatial correspondence between the received RAR and the transmitted PRACH preamble. In the example, spatial correspondence refers to a spatial relationship or beamforming similarity in transmitter/receiver (TX/RX) or receiver/transmitter (RX/TX) operations. In certain contexts, spatial correspondence can be distinguished from spatial QCL (spatial QCL may refer to similar TX configurations for multiple signals). In the embodiment of FIG. 7, the wireless device tries to detect RAR in the same direction(s) as the direction in which the PRACH preamble was transmitted if the wireless device has beam correspondence. With this beam correspondence, the wireless device can reuse spatial information (e.g., the selected beam direction(s)) from PRACH transmission for receiving the RAR. This type of spatial information may be easier to acquire in certain types of systems, e.g., time division duplex (TDD) systems.

If a one-to-one association exists between SSB and PRACH preamble indices (see "no" side of FIG. 7), the UE may assume that the RAR is spatially QCL with the selected SSB as in FIG. 6.

Figure 8:
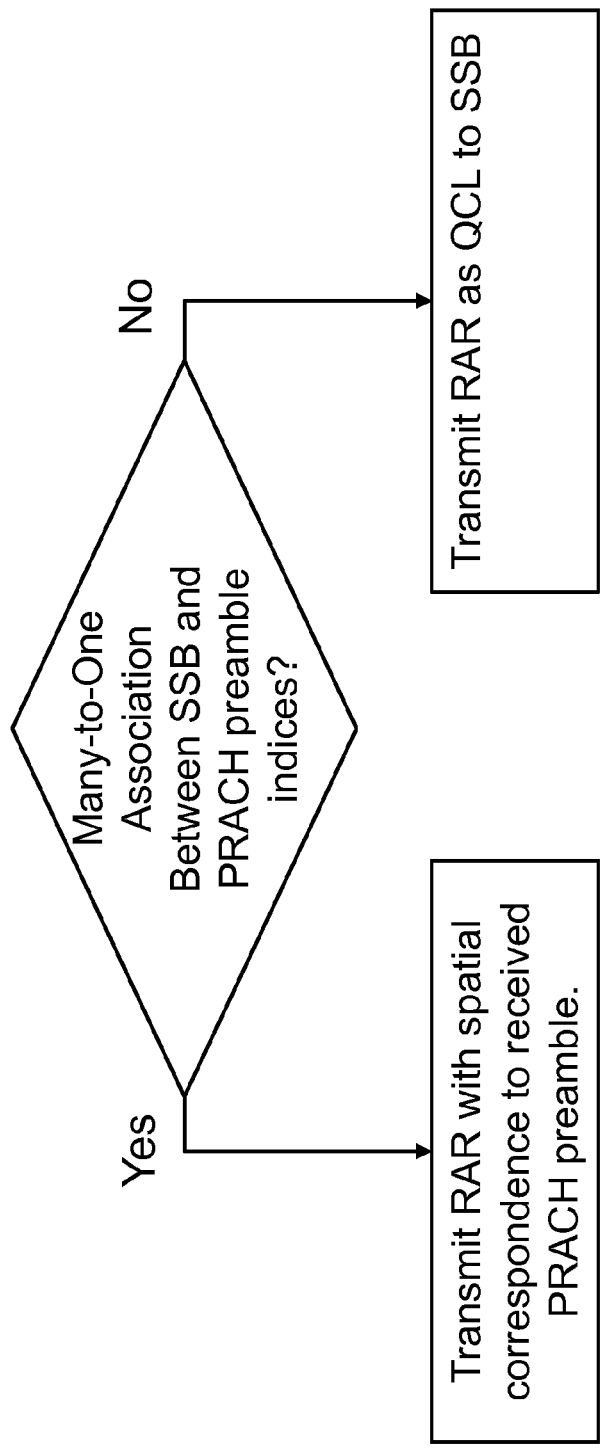
FIG. 8 illustrates an example of a method performed by a network node, in accordance with some embodiments.

FIG. 8 illustrates an example of network node (e.g., gNB) behavior, according to certain embodiments. When the gNB is configuring a wireless device (e.g., UE) with a many-to-one association between SSB and PRACH preamble indices (see "yes" side of FIG. 8), the gNB transmits RAR with spatial correspondence to the received PRACH preamble. In such embodiment, the gNB with reciprocity or beam correspondence uses the preferred PRACH RX beam settings to configure TX beams for RAR transmission.

If not configuring the cell with a many-to-one association between SSB and PRACH preamble indices (see "no" side of FIG. 8), the gNB should transmit the RAR as QCL with the SSB selected by the UE, where the selected SSB index is indicated by PRACH preamble from the UE.

In an alternative embodiment (not shown in FIG. 8), when a many-to-one association exists between SSB and PRACH preamble indices, the gNB may transmit the RAR by sweeping the RAR transmission over all SBB beams that map the received PRACH preamble. In that case, the UE can still assume that one of these RAR transmissions will be received QCL with the selected SSB beam.

In one embodiment, when the many-to-one association exists, the gNB uses one of the SSB beams to transmit the RAR. In yet another embodiment, when the many-to-one association exists, the gNB transmits the RAR in a beam different from any of the SSB beams that map to the received PRACH. One such beam may be a wide, cell-covering, or approximately isotropic beam.

In one embodiment, the network configures a many-to-one mapping to ensure that the UE does not assume QCL between SSB and RAR, but then in reality transmits a maximum of one SSB related to (associated with) each PRACH preamble. In this way, the network allows for silent nodes while still maintaining the benefits of the unique identification of SS blocks that one-to-one configuration would yield. This embodiment could also be mixed with other embodiments (i.e., the network could configure many-to-one and transmit only one SSB for some PRACH preambles but multiple SSBs for some other PRACH preambles.)

The configuration of "many-to-one association between SSB and PRACH preamble indices" can also be conveyed in a handover command when the UE needs to perform RACH with the target cells and wait for RAR. For handover, the RACH is associated to either SSBs or CSI-RS, as agreed for layer 3 (L3) mobility.

The wording of "many-to-one association between SSB and PRACH preamble indices" can also be described as "overlapping subsets", with regard to PRACH preamble indices, in the above descriptions and embodiments.

Configuration of the Many-to-One SSB/PRACH Indication

In one embodiment, a wireless device (e.g., UE) that is inactive or idle can be configured with the "many-to-one association between SSB and PRACH preamble indices" via system information, broadcasted per cell. The system information indicates to the UE that the cell in which the UE is camping (or groups of cells sharing the same system information) has a "many-to-one association between SSB and PRACH preamble indices." Based on receiving the indication, the wireless device shall act according to the previously described embodiments. Notice that, for each cell, the association is given for SSB with the same cell identifier.

In another embodiment, a wireless device (e.g., UE) that is connected can be configured with the "many-to-one association between SSB and PRACH preamble indices" via a dedicated RRC message. That message can be a release message that may indicate to the UE to move from connected to idle or inactive state. That message may indicate to the UE that the RACH resources associated to a cell, group of cells, RAN area, or tracking area have a "many-to-one association between SSB and PRACH preamble indices."

In a further embodiment, a wireless device (e.g., UE) that is connected can be configured with the "many-to-one association between SSB and PRACH preamble indices" via a dedicated RRC message. That message can be a handover command, i.e., an RRC connection reconfiguration, that indicates to the UE that the RACH resources associated to the target cell have a "many-to-one association between SSB and PRACH preamble indices".

These RACH resources can be dedicated RACH or common RACH resources. There can be different "many-to-one association between SSB and PRACH preamble indices" for common and dedicated RACH resources. And, consequently, when the UE performs random access associated with a common or a dedicated RACH, it shall use these indications depending on whether the UE is using common or dedicated RACH resources. In an embodiment, if a dedicated RACH fails during a handover, the UE may fallback to a common RACH and may use the "many-to-one association between SSB and PRACH preamble indices" indicated for the common RACH.

Different RS Types as DL Beamforming Reference

Although the previously described embodiment uses the term "many-to-one association between SSB and PRACH preamble indices", indicating the SSB as the DL reference signal, the embodiments are equally applicable for any other reference signal transmitted in the DL that are beamformed and that could be used as reference for beam selection before random access is initiated. One example applicable in NR is CSI-RS as being the reference signal, especially in handovers.

Example Network

Figure 9:
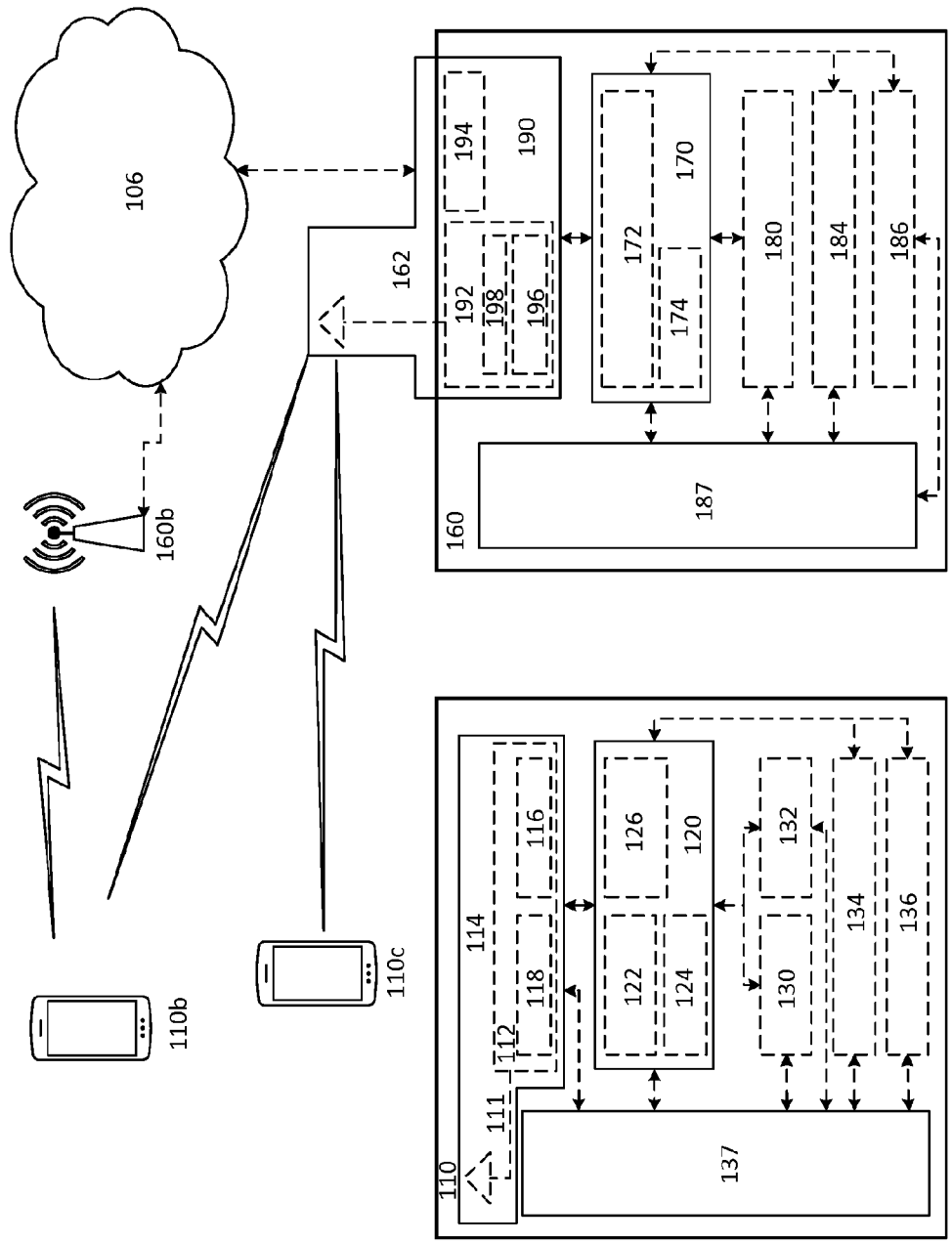
FIG. 9 illustrates an example of a wireless network, in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 10:
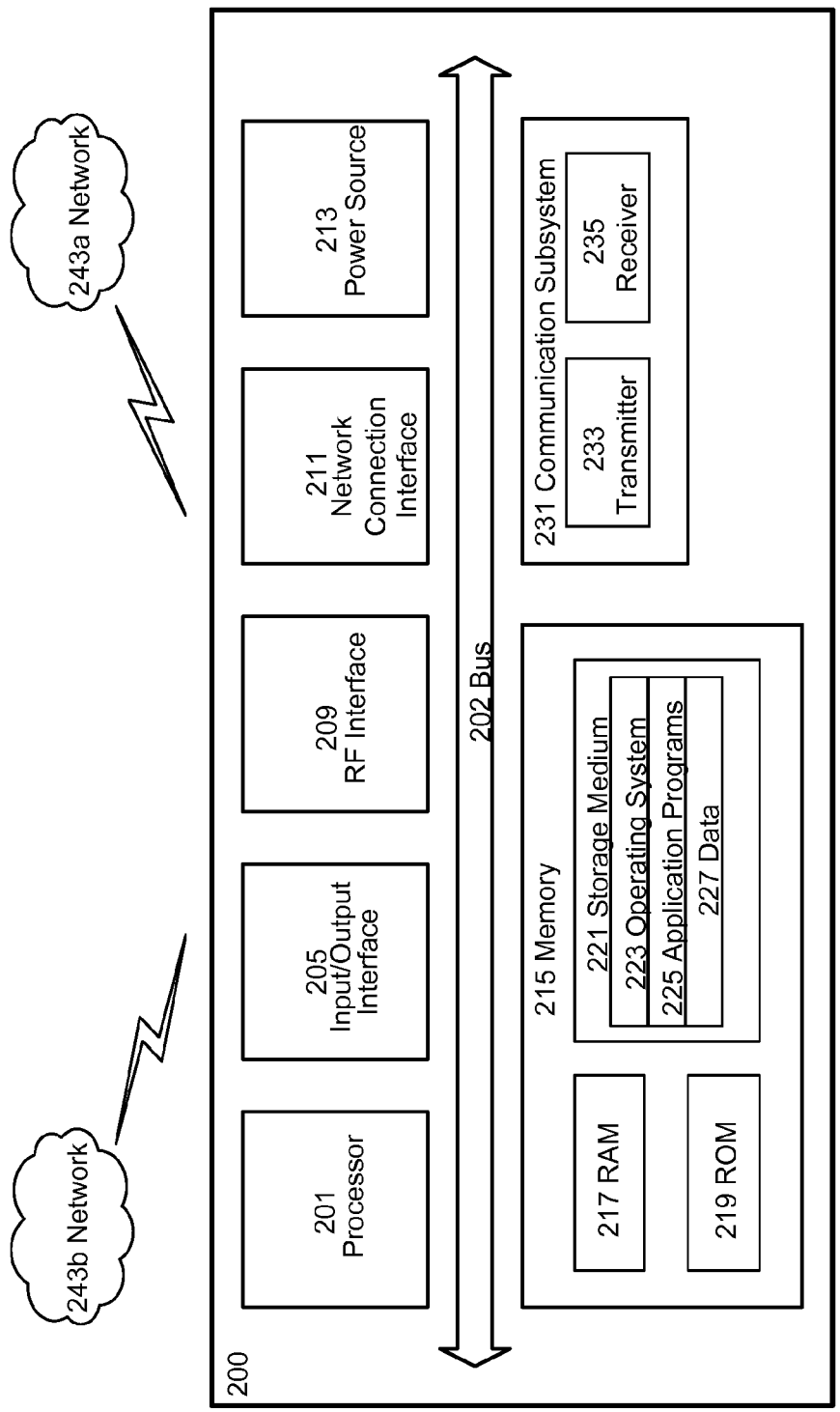
FIG. 10 illustrates an example of User Equipment, in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 10, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 10, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 11:
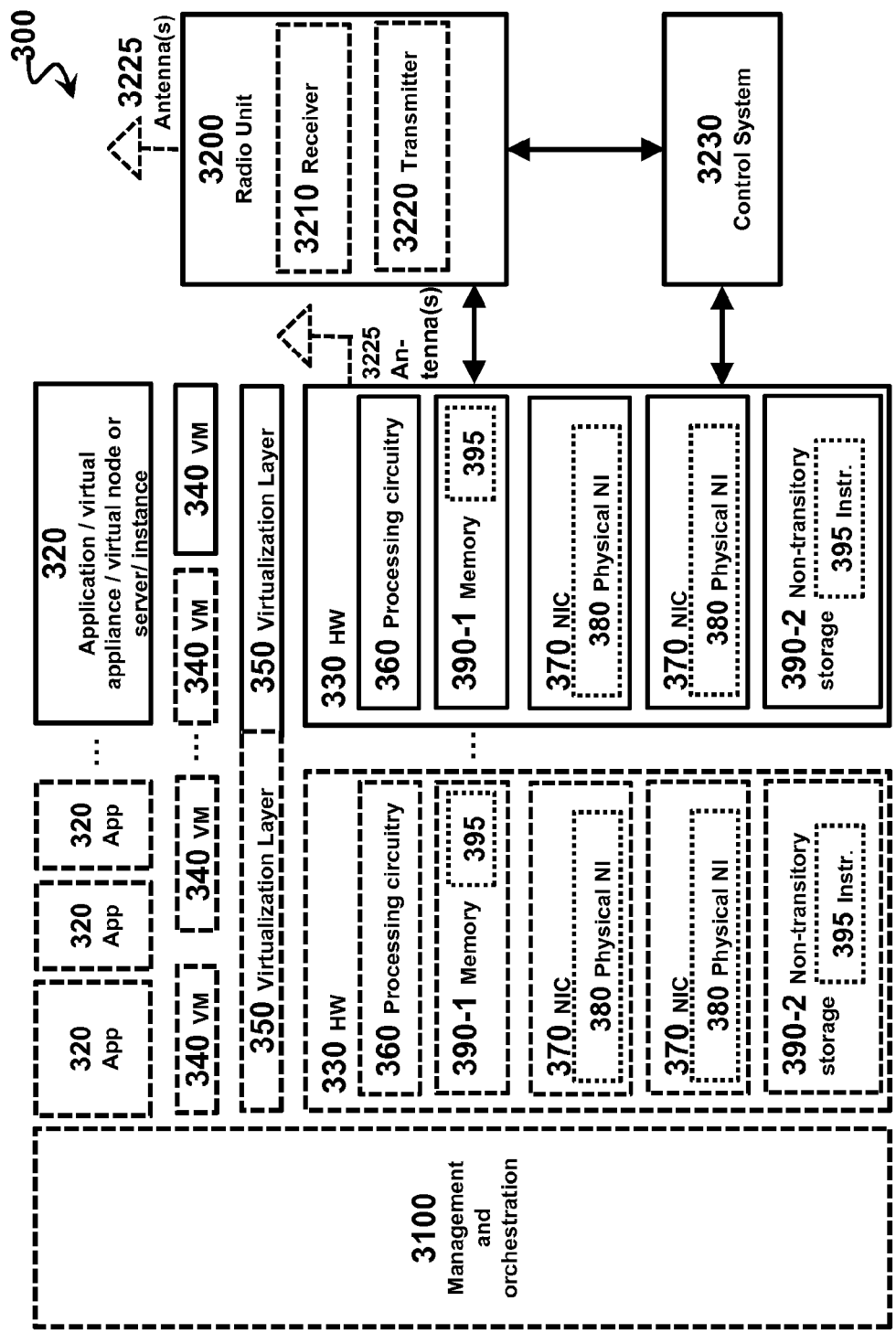
FIG. 11 illustrates an example of a virtualization environment, in accordance with some embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 11.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 12:
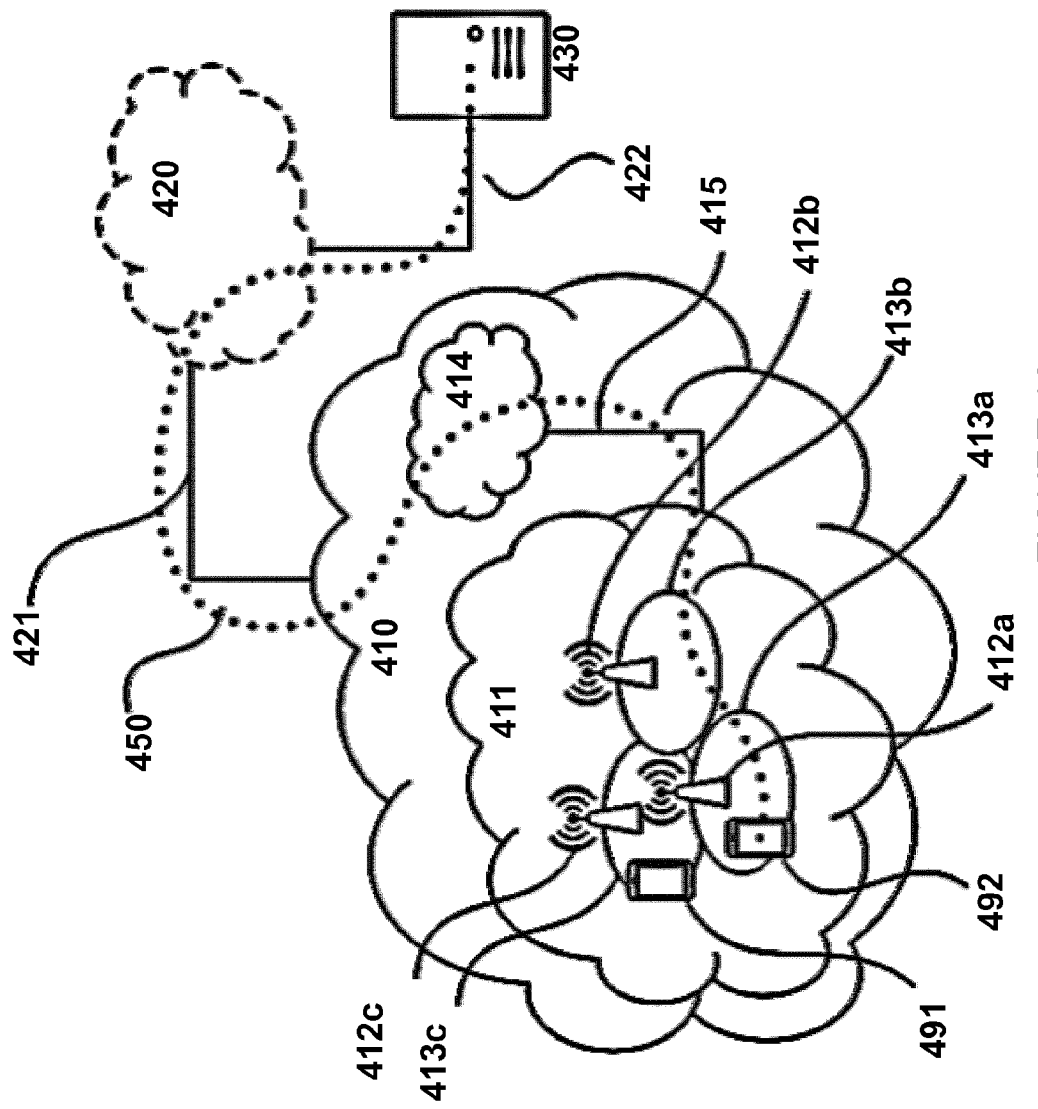
FIG. 12 illustrates an example of a telecommunication network connected via an intermediate network to a host computer, in accordance with some embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 13:
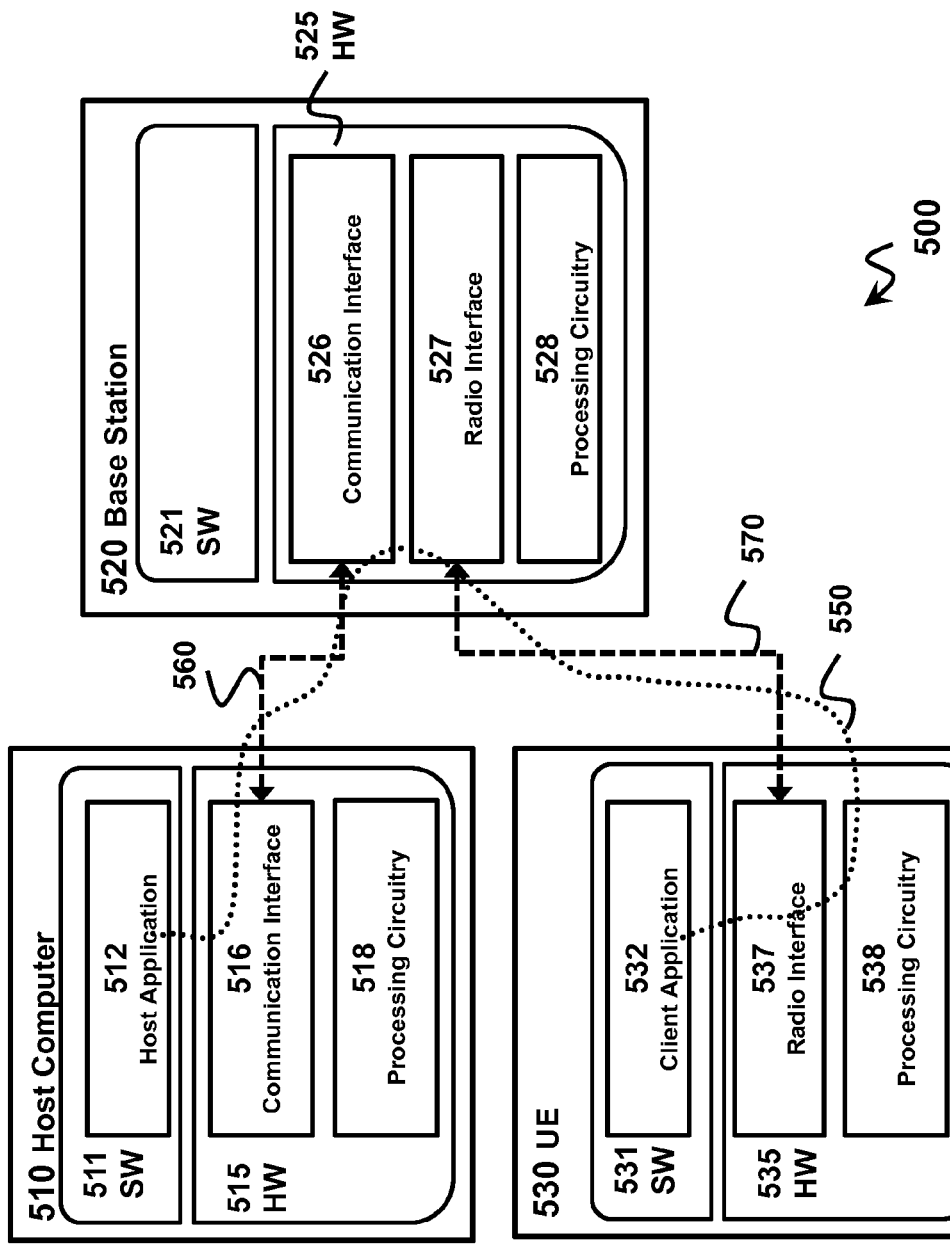
FIG. 13 illustrates an example of a host computer communicating via a base station with a user equipment over a partially wireless connection, in accordance with some embodiments.

It is noted that host computer 510, base station 520 and UE 530 illustrated in FIG. 13 may be similar or identical to host computer 430, one of base stations 412a, 412b, 412c and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate and power consumption and thereby provide benefits such as reduced user waiting time and better end user equipment power efficiency. The random access procedure is the first step in providing service to the end user. By improving the efficiency of this step in the process means that an OTT connection can be established more quickly and more reliably in diverse environments. For example, embodiments of the present disclosure enable the use of silent nodes for PRACH detection and RAR transmission in an NR network, which may facilitate increased use of silent nodes. As discussed above, silent nodes can save energy and reduce interference by not transmitting synchronization and broadcast signals.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 14:
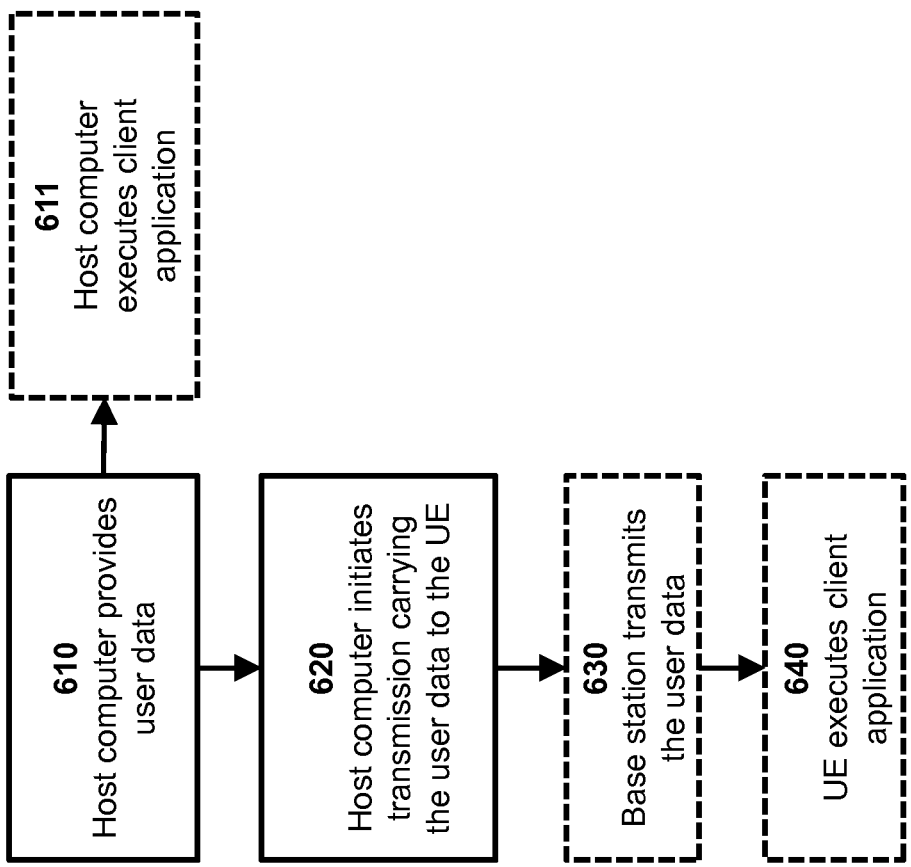
FIG. 14 illustrates an example of methods implemented in a communication system including a host computer, a base station and a user equipment, in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 15:
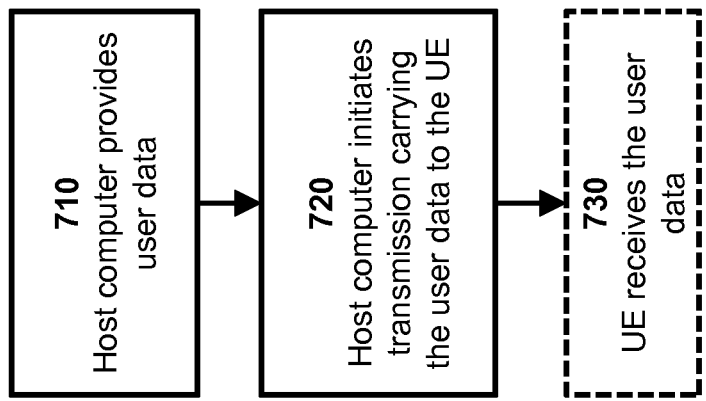
FIG. 15 illustrates an example of methods implemented in a communication system including a host computer, a base station and a user equipment, in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 16:
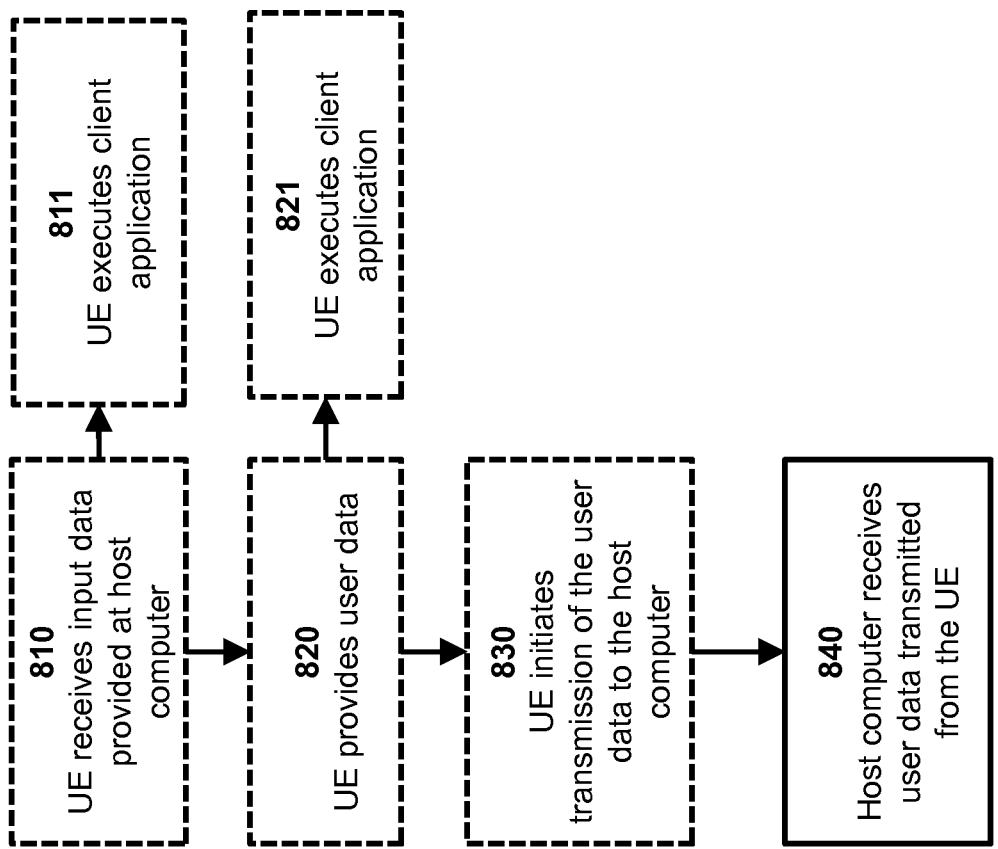
FIG. 16 illustrates an example of methods implemented in a communication system including a host computer, a base station and a user equipment, in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 17:
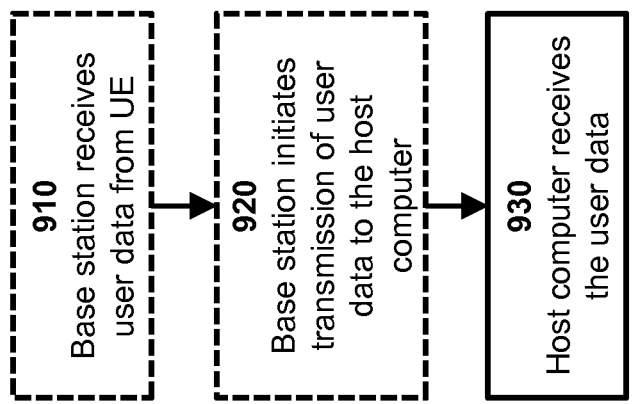
FIG. 17 illustrates an example of methods implemented in a communication system including a host computer, a base station and a user equipment, in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
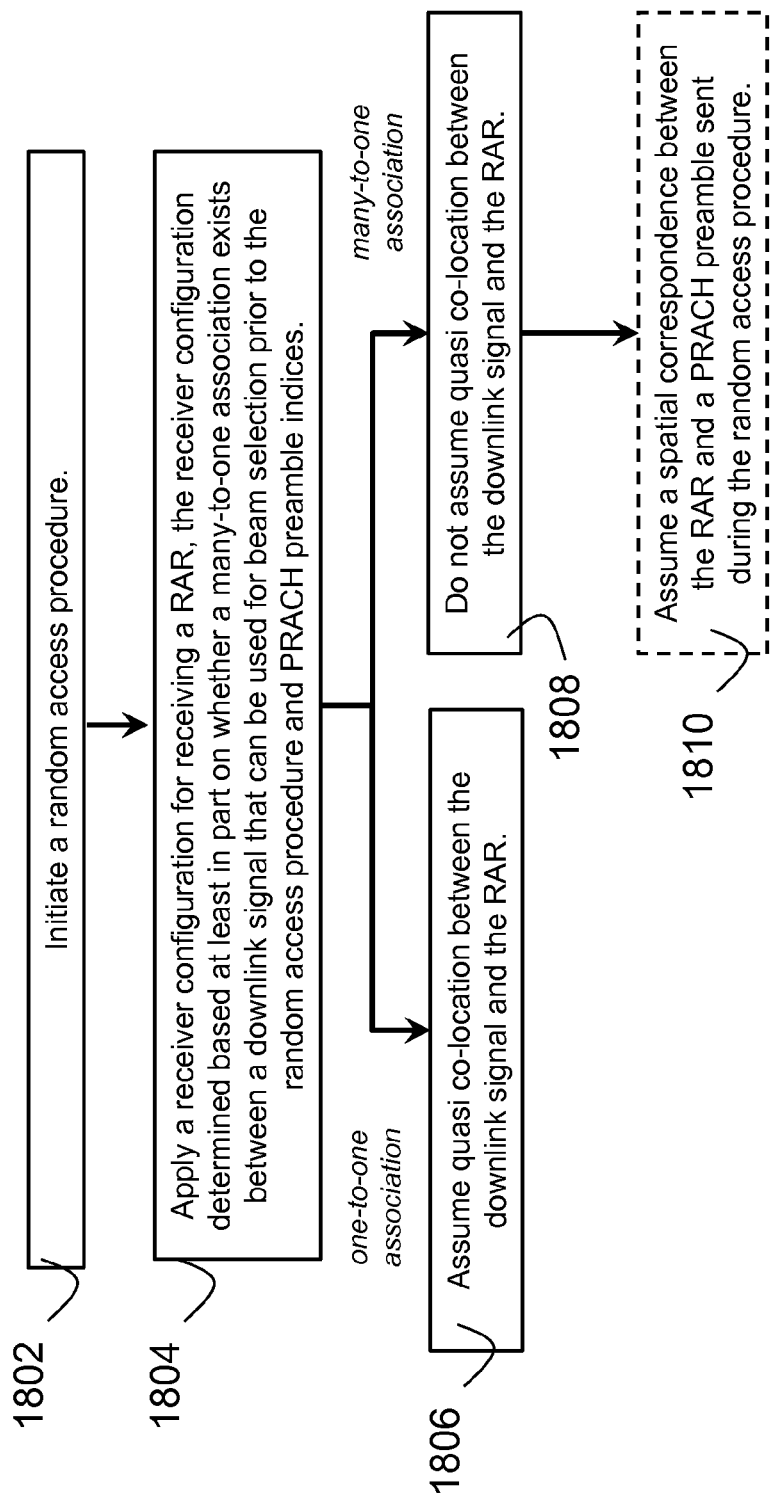
FIG. 18 illustrates an example of a method performed by a wireless device, in accordance with some embodiments.

FIG. 18 depicts a method for use in a wireless device, in accordance with particular embodiments, the method begins at step 1802 with initiating a random access procedure. For example, the method sends a PRACH preamble to a network node. The method proceeds to step 1804 with applying a receiver configuration for receiving a RAR. The receiver configuration is determined based at least in part on whether a many-to-one association exists between a downlink signal that can be used for beam selection prior to the random access procedure (e.g., SSB or CSI-RS) and PRACH preamble indices. In some embodiments, the association between the downlink signal and the PRACH preamble indices (e.g., many-to-one or one-to-one) can be determined from information received from the network when the wireless device is idle or inactive (e.g., via broadcast signalling) or when the wireless device is connected (e.g., via dedicated RRC signalling, such as a handover command or release message). If the association is one-to-one, the method proceeds to step 1806 in which quasi co-location is assumed between the downlink signal and the RAR. If at step 1804 the association is many-to-one, the method proceeds to step 1808 in which quasi co-location is not assumed between the downlink signal and the RAR. Optionally, in certain embodiments, the method proceeds from step 1808 to 1810, where a spatial correspondence is assumed between the RAR and a PRACH preamble sent during the random access procedure. The method may then monitor the downlink for the RAR according to the applied receiver configuration. Once the RAR is received, the method may proceed with establishing the connection. For example, in some embodiments, the RAR may indicate a grant of uplink resources, and the wireless device may use the indicated uplink resources to send a connection request message for establishing the connection.

Figure 19:
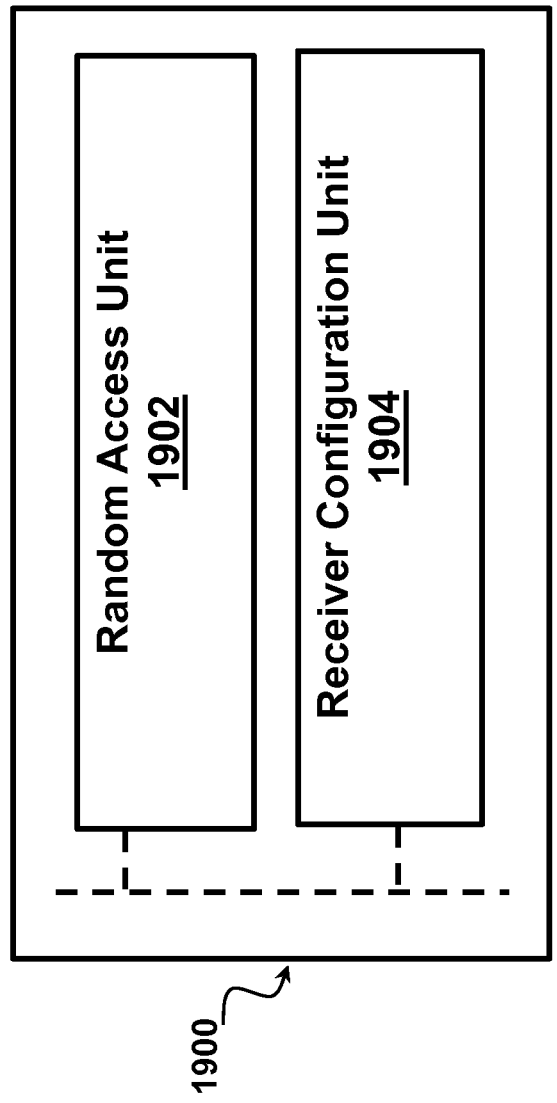
FIG. 19 illustrates an example of a virtualization apparatus, in accordance with some embodiments.

FIG. 19 illustrates a schematic block diagram of an apparatus 1900 in a wireless network (for example, the wireless network shown in FIG. 9). The apparatus may be implemented in a wireless device (e.g., wireless device 110 shown in FIG. 9). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause random access unit 1902, receiver configuration unit 1904, and any other suitable units of apparatus 1900 to perform corresponding functions according one or more embodiments of the present disclosure.

As illustrated in FIG. 19, apparatus 1900 includes random access unit 1902 and receiver configuration unit 1904. Random access unit 1902 is configured to perform a random access procedure. For example, the random access procedure may include sending PRACH preambles to the network and receiving a RAR from the network. Receiver configuration unit 1904 is configured to apply a receiver configuration for receiving downlink signals. For example, receiver configuration unit 1904 applies a receiver configuration for receiving a RAR. The receiver configuration is determined based at least in part on whether a many-to-one association exists between a downlink signal that can be used for beam selection prior to the random access procedure (e.g., SSB or CSI-RS) and PRACH preamble indices.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
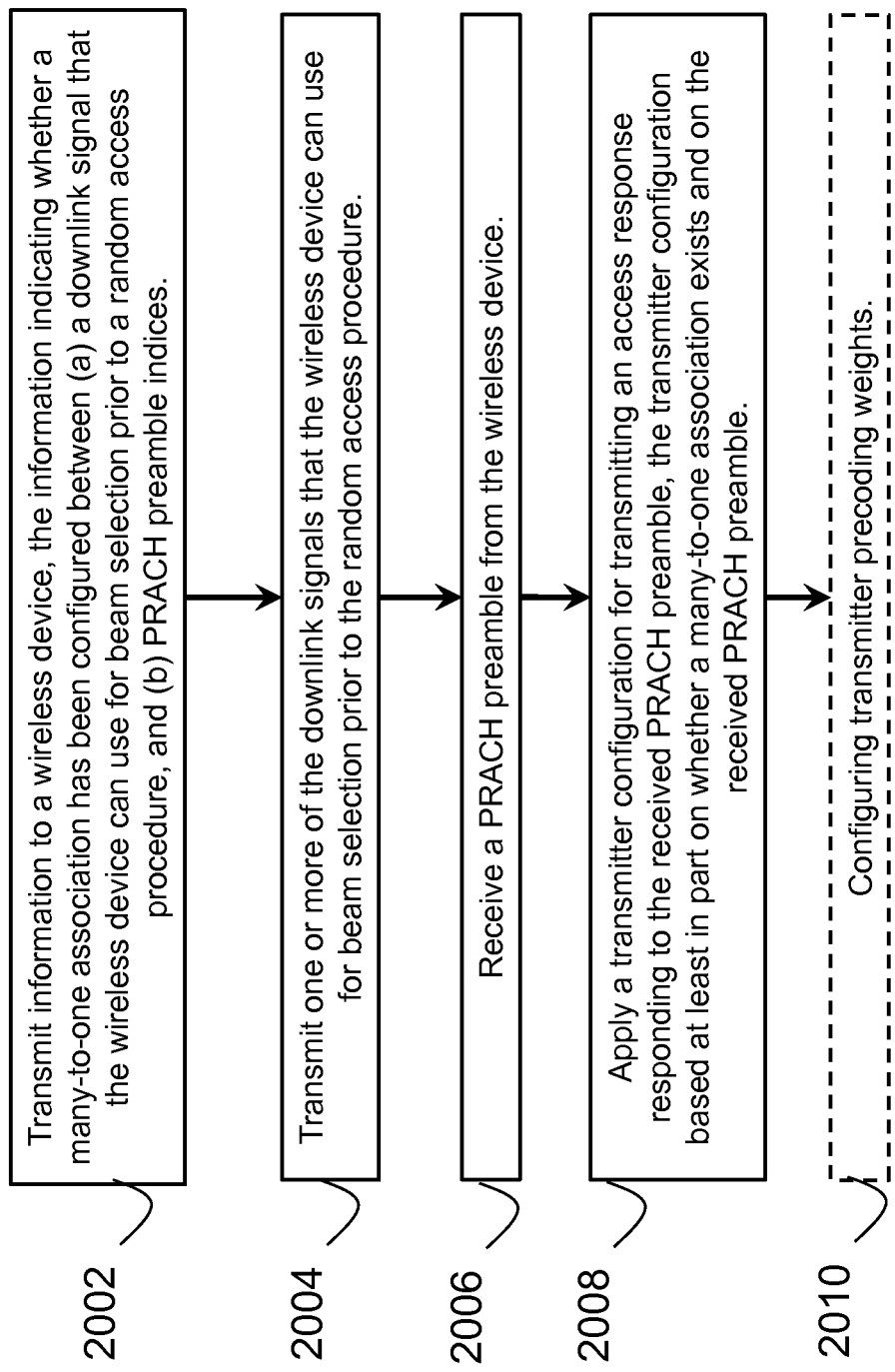
FIG. 20 illustrates an example of a method performed by a network node, in accordance with some embodiments.

FIG. 20 depicts a method for use in a network node, such as a gNB or base station described herein, for example, base station 160, 412, 520, or 2122. In accordance with particular embodiments, the method begins at step 2002 with transmitting information to a wireless device. The information indicates whether a one-to-one or many-to-one association exists between a downlink signal that the wireless device can use for beam selection prior to a random access procedure (e.g., SSB or CSI-RS) and PRACH preamble indices. The method continues to step 2004 with transmitting one or more of the downlink signals. As an example, the method may transmit one or more SSBs. In some embodiments, the method transmits two or more SSBs on different beams. As another example, the method may transmit one or more CSI-RSs. In some embodiments, the method transmits two or more CSI-RSs on different beams. The method continues to step 2006, where the method receives a PRACH preamble from the wireless device. The method continues to step 2008, where the method applies a transmitter configuration for transmitting an access response for responding to the received PRACH preamble. As an example, the access response may be a Random Access Response or Msg2, such as described above with respect to FIG. 1. The transmitter configuration is based at least in part on whether a many-to-one association exists and on the received PRACH preamble. For example, in certain embodiments, when the one-to-one association is configured between the downlink signal and the PRACH preamble indices (rather than the many-to-one association), the transmitter configuration applies quasi co-location to the downlink signal and the RAR. As another example, in certain embodiments, when the many-to-one association exists between the downlink signal and the PRACH preamble indices, the transmitter configuration transmits with spatial correspondence between the RAR and the received PRACH preamble.

When the many-to-one association exists between the downlink signal and the PRACH preamble indices, at any given instance, the network node may have the option of configuring the transmitter to apply or not apply quasi co-location between the downlink signal and the access response. However, the wireless device receiving the access response cannot assume that the network node has applied quasi co-location if the many-to-one association exists between the downlink signal and the PRACH preamble indices.

In certain embodiments, the method further comprises configuring the transmitter to use TX precoding weights in step 2010. For example, in some embodiments, the method configures the TX precoding weights that were applied for transmitting the downlink signal indicated by the received PRACH preamble resources if the mapping between the downlink signal and the PRACH preamble indices comprises a one-to-one association. As another example, in some embodiments, the method configures TX precoding weights that focus the access response energy in the direction of the PRACH reception if the mapping between the downlink signal and the PRACH preamble indices comprises the many-to-one association.

Figure 21:
FIG. 21 illustrates an example of a virtualization apparatus, in accordance with some embodiments.

FIG. 21 illustrates a schematic block diagram of an apparatus 2122 in a wireless network (for example, the wireless network shown in FIG. 9). The apparatus may be implemented in a network node (e.g., network node 160 shown in FIG. 9). Apparatus 2122 is operable to carry out the example method described with reference to FIG. 20 and possibly any other processes or methods disclosed herein. It is also to be understood that the method of FIG. 20 is not necessarily carried out solely by apparatus 2122. At least some operations of the method can be performed by one or more other entities.

Virtual Apparatus 2122 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause random access unit 2124, transmitter configuration unit 2126, and any other suitable units of apparatus 2122 to perform corresponding functions according one or more embodiments of the present disclosure.

As illustrated in FIG. 21, apparatus 2122 includes random access unit 2124 and transmitter configuration unit 2126. Random access unit 2124 is configured to perform a random access procedure. For example, the random access procedure may include receiving PRACH preambles from a wireless device and transmitting a RAR to the wireless device in response. Transmitter configuration unit 2126 is configured to apply a transmitter configuration for transmitting downlink signals. For example, transmitter configuration unit 2126 applies a transmitter configuration for transmitting the RAR. The transmitter configuration is determined based at least in part on whether a many-to-one association exists between a downlink signal that the wireless device can use for beam selection prior to the random access procedure (e.g., SSB or CSI-RS) and PRACH preamble indices.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22A:
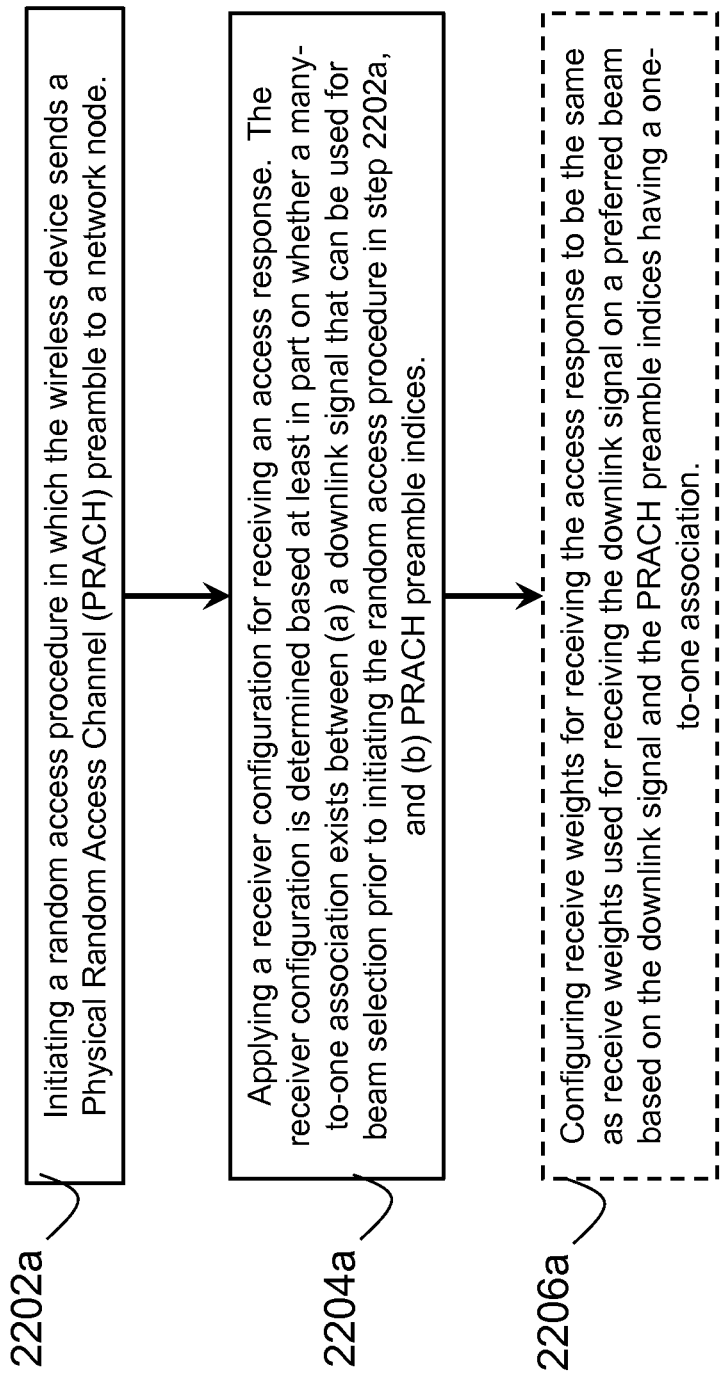
FIG. 22a illustrates an example of a method performed by a wireless device, in accordance with some embodiments.

FIG. 22a illustrates an example of a method performed by a wireless device, such as a wireless device (or UE) described above, for example, with respect to any of FIG. 9-13 or 17. The method begins at step 2202a with initiating a random access procedure in which the wireless device sends a PRACH preamble to a network node.

The method continues to step 2204a with applying a receiver configuration for receiving an access response. As an example, the access response may be a Random Access Response or Msg2, such as described above with respect to FIG. 1. The receiver configuration applied at step 2204a is determined based at least in part on whether a many-to-one association exists between (a) a downlink signal that can be used for beam selection prior to the initiating the random access procedure in step 2202a, and (b) PRACH preamble indices. Examples of downlink signals that can be used for beam selection include SSB and CSI-RS signals. In some embodiments, the determination whether the many-to-one association exists is based on broadcast information received from the network while the wireless device is idle or inactive. Examples of broadcast information that may be used to indicate whether the many-to-one association exists include PBCH (e.g., MIB), RMSI (e.g., SIB1), or OSI (e.g., SIB2). In other embodiments, the determination whether the many-to-one association exists is based on dedicated signaling received from the network while the wireless device is connected, such as RRC signaling (e.g., release message or handover command received via RRC signaling).

In the example of FIG. 22a, it is determined that a one-to-one association has been configured between the downlink signal and the PRACH preamble indices (i.e., a one-to-one association exists between the downlink signal and the PRACH preamble indices). Accordingly, the receiver configuration applied in step 2204a assumes quasi co-location between the downlink signal and the access response. In some embodiments, when the downlink signal and the PRACH preamble indices are determined to have a one-to-one association, the method further comprises configuring receive weights for receiving the access response to be the same as receive weights used for receiving the downlink signal on a preferred beam, as show in step 2206a.

Figure 22B:
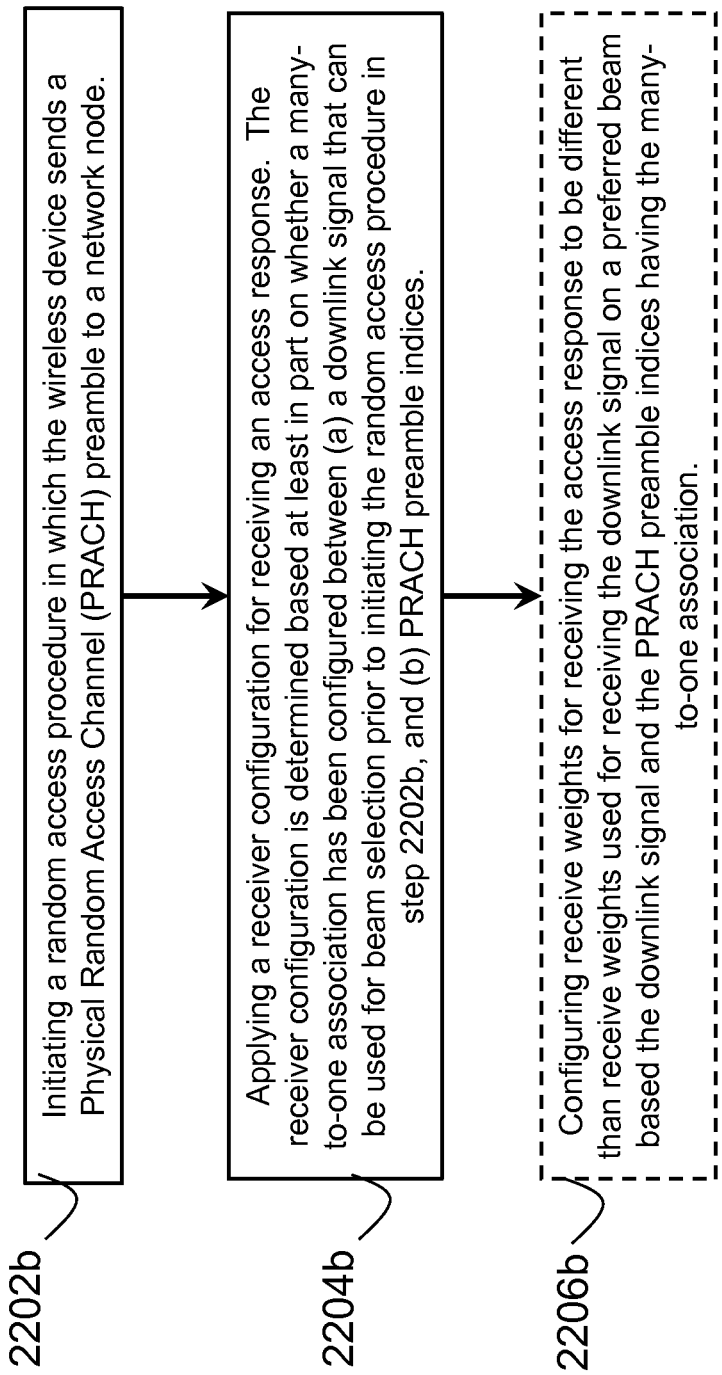
FIG. 22b illustrates an example of a method performed by a wireless device, in accordance with some embodiments.

FIG. 22b is similar to FIG. 22a except that, in the example of FIG. 22b, it is determined that the many-to-one association exists between the downlink signal and the PRACH preamble indices. When the many-to-one association exists between the downlink signal and the PRACH preamble indices, the receiver configuration applied in step 2204b does not assume quasi co-location between the downlink signal and the access response. Accordingly, the receiver configuration may use another technique to detect the access response, such as beam scanning (e.g., using a single receive interval and applying different receive weights in baseband processing) or using a wider beam for the reception of the access response compared to the receiver configuration that assumes quasi co-location between the downlink signal and the access response. In some embodiments, the receiver configuration is determined based on assuming a spatial correspondence between the access response and the PRACH preamble sent during the random access procedure. In some embodiments, when the downlink signal and the PRACH preamble indices are determined to have a many-to-one association, the method further comprises configuring receive weights for receiving the access response to be different than receive weights used for receiving the downlink signal on a preferred beam, as show in step 2206b. In some embodiments a computer program, computer program product or computer readable storage medium comprises instructions which when executed on a computer, cause the computer to perform any of the embodiments disclosed herein. In further examples the instructions are carried on a signal or carrier and which are executable on a computer wherein when executed perform any of the embodiments disclosed herein.

EXAMPLES

Group A Examples

A method performed by a wireless device for performing a random access procedure, the method comprising:
  initiating a random access procedure in which the wireless device sends a Physical Random Access Channel (PRACH) preamble to a network node; and
  applying a receiver configuration for receiving a Random Access Response (RAR), the receiver configuration determined based at least in part on whether a many-to-one association has been configured between (a) a downlink signal that, prior to the random access procedure, can be used for beam selection, and (b) PRACH preamble indices.

The method of the previous example, wherein the downlink signal that can be used for beam selection comprises a Synchronization Signal Block (SSB).

The method of any of the previous examples, wherein the downlink signal that can be used for beam selection comprises a Channel State Information-Reference Signal (CSI-RS).

The method of any of the previous examples, wherein, when the many-to-one association has not been configured between the downlink signal and the PRACH preamble indices, the receiver configuration assumes quasi co-location between the downlink signal and the RAR.

The method of any of the previous examples, wherein, when the many-to-one association has been configured between the downlink signal and the PRACH preamble indices, the receiver configuration does not assume quasi co-location between the downlink signal and the RAR.

The method of the previous example, wherein the receiver configuration that does not assume quasi co-location between the downlink signal and the RAR uses beam scanning to detect the RAR.

The method of the example previous to the previous example, wherein the receiver configuration that does not assume quasi co-location between the downlink signal and the RAR uses a wider beam for the reception of the RAR compared to the receiver configuration that assumes quasi co-location between the downlink signal and the RAR.

The method of any of the previous examples, wherein, when the many-to-one association has been configured between the downlink signal and the PRACH preamble indices, the receiver configuration is determined based on assuming a spatial correspondence between the RAR and the PRACH preamble sent during the random access procedure.

The method of any of the previous examples, wherein the determination whether the many-to-one association has been configured is based on broadcast information received from the network while the wireless device is idle or inactive.

The method of any of the previous examples, the determination whether the many-to-one association has been configured is based on dedicated signaling received from the network while the wireless device is connected.

The method of example 10, wherein the dedicated signaling comprises a release message sent via radio resource control (RRC) signaling.

The method of example 10, wherein the dedicated signaling comprises a handover command received via radio resource control (RRC) signaling.

The method of any of the previous examples, further comprising configuring receive weights for receiving the RAR to be the same as receive weights used for receiving the downlink signal on a preferred beam based on the downlink signal and the PRACH preamble indices having a one-to-one association.

The method of any of the previous examples, further comprising configuring receive weights for receiving the RAR to be different than receive weights used for receiving the downlink signal on a preferred beam based the downlink signal and the PRACH preamble indices having the many-to-one association.

The method of any of the previous examples, further comprising:
  providing user data; and
  forwarding the user data to a host computer via the transmission to the base station.

Group B Examples

A method performed by a base station for performing a random access procedure, the method comprising:
  transmitting configuration information to a wireless device, the configuration information indicating whether a many-to-one association has been configured between (a) a downlink signal that the wireless device can use for beam selection prior to a random access procedure, and (b) PRACH preamble indices;
  transmitting two or more of the downlink signals that the wireless device can use for beam selection prior to the random access procedure;
  receiving a PRACH preamble from the wireless device;
  applying a transmitter configuration for transmitting a RAR responding to the received PRACH preamble, the transmitter configuration based at least in part on the configuration information and the received PRACH preamble.

The method of the previous example, wherein the downlink signal that can be used for beam selection comprises a Synchronization Signal Block (SSB).

The method of any of the previous examples, wherein the downlink signal that can be used for beam selection comprises a Channel State Information-Reference Signal (CSI-RS).

The method of any of the previous examples, wherein, when the many-to-one association has not been configured between the downlink signal and the PRACH preamble indices, the transmitter configuration applies quasi co-location to the downlink signal and the RAR.

The method of any of the previous examples, wherein, when the many-to-one association has been configured between the downlink signal and the PRACH preamble indices, the transmitter configuration does not apply quasi co-location between the downlink signal and the RAR.

The method of the previous example, wherein the transmitter configuration that does not apply quasi co-location between the downlink signal and the RAR uses beam sweeping over all beams that map to the received PRACH preamble.

The method of any of the previous examples, wherein, when the many-to-one association has been configured between the downlink signal and the PRACH preamble indices, the transmitter configuration transmits with spatial correspondence between the RAR and the received PRACH preamble.

The method of any of the previous examples, wherein the configuration information is sent to the wireless device via broadcast messaging.

The method of any of the previous examples, wherein the configuration information is sent to the wireless device via dedicated signaling.

The method of example the previous example, wherein the dedicated signaling comprises a release message sent via radio resource control (RRC) signaling.

The method of example previous to the previous example, wherein the dedicated signaling comprises a handover command received via radio resource control (RRC) signaling.

The method of any of the previous examples, wherein when the many-to-one association exists, the method uses a beam different from any of the beams that map to the received PRACH.

The method of the previous example, wherein the different beam comprises a wide, cell-covering, or approximately isotropic beam.

The method of any of the previous examples, wherein the configuration information transmitted to the wireless device indicates the many-to-one association has been configured between the downlink signal and the PRACH preamble indices, but the method actually transmits the downlink signal according to a one-to-one association with the PRACH preamble indices.

The method of any of the previous examples, further comprising configuring the transmitter to use TX precoding weights that were applied for transmitting the downlink signal indicated by the received PRACH preamble resources if the mapping between the downlink signal and the PRACH preamble indices comprises a one-to-one association.

The method of any of the previous examples, further comprising configuring the transmitter to use TX precoding weights that focus the RAR energy in the direction of the PRACH reception if the mapping between the downlink signal and the PRACH preamble indices comprises the many-to-one association.

The method of any of the previous examples, further comprising:
    obtaining user data; and
    forwarding the user data to a host computer or a wireless device.

Group C Examples

A wireless device for performing a random access procedure, the wireless device comprising:
    processing circuitry configured to perform any of the steps of any of the Group A examples; and
    power supply circuitry configured to supply power to the wireless device.

A base station for performing a random access procedure, the base station comprising:
    processing circuitry configured to perform any of the steps of any of the Group B examples;
    power supply circuitry configured to supply power to the wireless device.

A user equipment (UE) for performing a random access procedure, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A examples;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B examples.

The communication system of the pervious example further including the base station.

The communication system of the previous 2 examples, further including the UE, wherein the UE is configured to communicate with the base station.

The communication system of the previous 3 examples, wherein:
    the processing circuitry of the host computer is configured to execute a host application, thereby providing the user data; and
    the UE comprises processing circuitry configured to execute a client application associated with the host application.

A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B examples.

The method of the previous example, further comprising, at the base station, transmitting the user data.

The method of the previous 2 examples, wherein the user data is provided at the host computer by executing a host application, the method further comprising, at the UE, executing a client application associated with the host application.

A user equipment (UE) configured to communicate with a base station, the UE comprising a radio interface and processing circuitry configured to performs the of the previous 3 examples.

A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A examples.

The communication system of the previous example, wherein the cellular network further includes a base station configured to communicate with the UE.

The communication system of the previous 2 examples, wherein:

the processing circuitry of the host computer is configured to execute a host application, thereby providing the user data; and the UE's processing circuitry is configured to execute a client application associated with the host application.

A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A examples.

The method of the previous example, further comprising at the UE, receiving the user data from the base station.

A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A examples.

The communication system of the previous example, further including the UE.

The communication system of the previous 2 examples, further including the base station, wherein the base station comprises a radio interface configured to communicate with the UE and a communication interface configured to forward to the host computer the user data carried by a transmission from the UE to the base station.

The communication system of the previous 3 examples, wherein:

the processing circuitry of the host computer is configured to execute a host application; and the UE's processing circuitry is configured to execute a client application associated with the host application, thereby providing the user data.

The communication system of the previous 4 examples, wherein:

the processing circuitry of the host computer is configured to execute a host the UE's processing circuitry is configured to execute a client application associated with the host application, thereby providing the user data in response to the request data.

A method implemented in a communication system including a host computer, a base station and a user equipment (UE), the method comprising:

at the host computer, receiving user data transmitted to the base station from the UE, wherein the UE performs any of the steps of any of the Group A examples.

The method of the previous example, further comprising, at the UE, providing the user data to the base station.

The method of the previous 2 examples, further comprising:

at the UE, executing a client application, thereby providing the user data to be transmitted; and at the host computer, executing a host application associated with the client application.

The method of the previous 3 examples, further comprising:

at the UE, executing a client application; and at the UE, receiving input data to the client application, the input data being provided at the host computer by executing a host application associated with the client application, wherein the user data to be transmitted is provided by the client application in response to the input data.

A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B examples.

The communication system of the previous example further including the base station.

The communication system of the previous 2 examples, further including the UE, wherein the UE is configured to communicate with the base station.

The communication system of the previous 3 examples, wherein:

the processing circuitry of the host computer is configured to execute a host application;

the UE is configured to execute a client application associated with the host application, thereby providing the user data to be received by the host computer.

A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A examples.

The method of the previous example, further comprising at the base station, receiving the user data from the UE.

The method of the previous 2 examples, further comprising at the base station, initiating a transmission of the received user data to the host computer.

The Following Provides Further Description of the Disclosed Embodiments and Examples Random access procedure is used for initial system access, transition from idle to active mode, and handover. It is a critical part of an efficient cellular network design.

Figure 1:
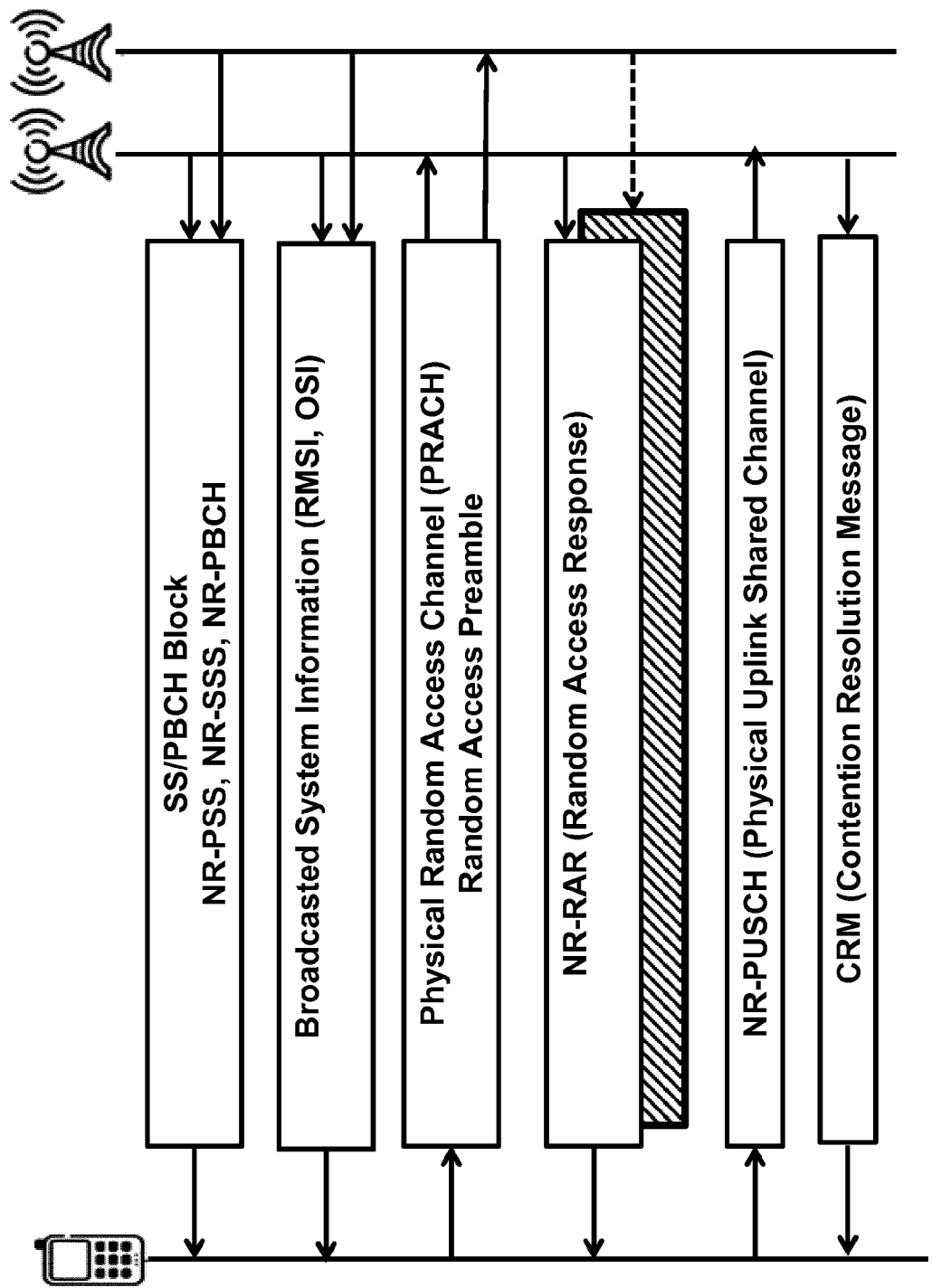
FIG. 1 illustrates an example of a random access procedure, in accordance with some embodiments.
Figure 2:
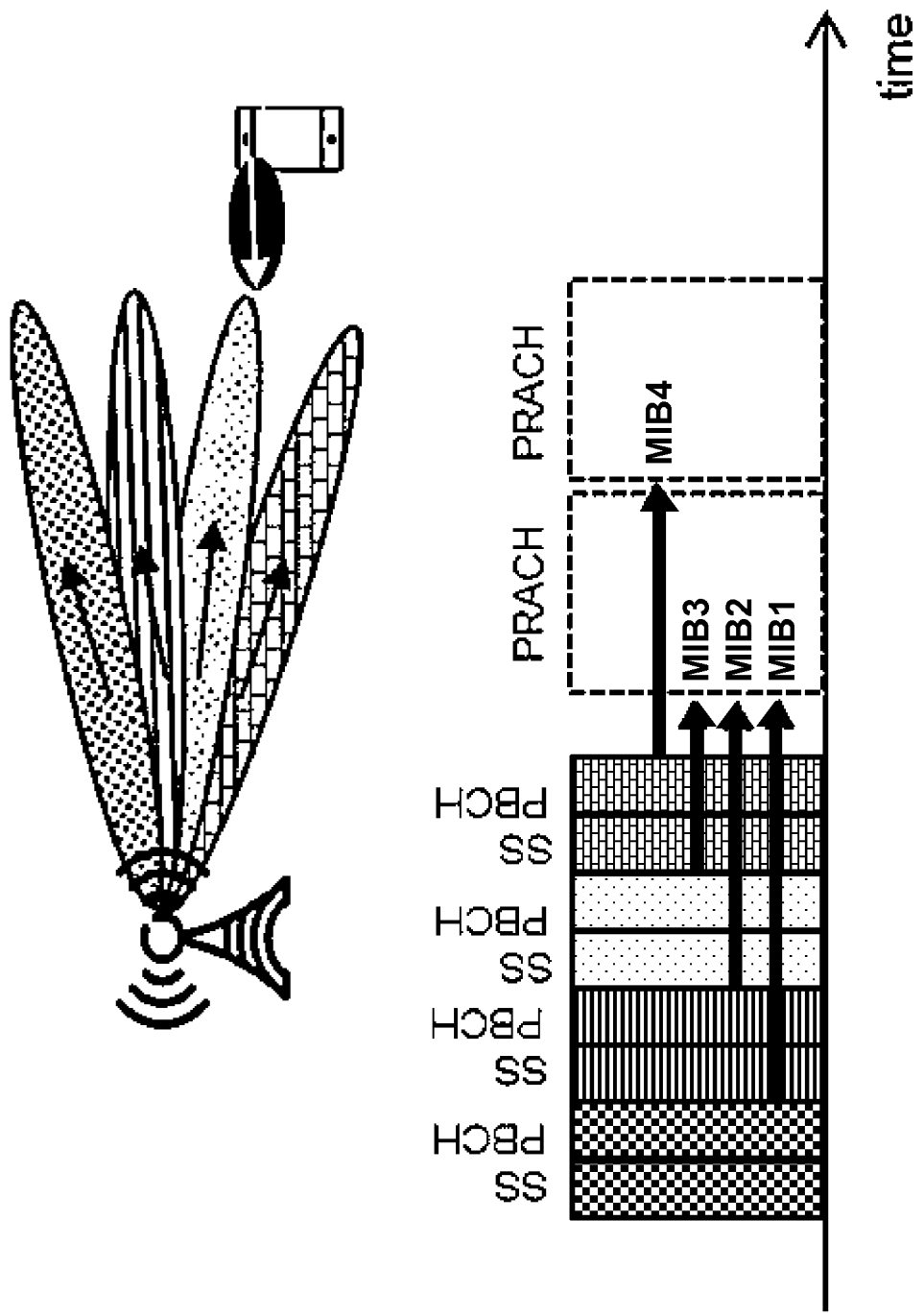
FIG. 2 illustrates an example of a relation between synchronization signals (SS), master information block (MIB), and PRACH resources, in accordance with some embodiments.

The random-access procedure for NR should reuse the main principles of the LTE design. However, since a wider range of deployment scenarios and increased requirements on lean design are expected, some changes to the legacy procedures are necessary. In particular, RACH transmission principles need refinement. A proposed design for the NR 4-step random access procedure is illustrated in FIG. 1.

The following points regarding the RACH procedure are considered:
QCL assumptions
   SSB and RAR, SSB and PRACH
Contents of RAR
   Sizes of RAPID, TA, UL grant, and TC-RNTI
RA-RNTI
Msg3, Msg4
PRACH preamble power ramping procedure
Power control related aspects of Msg3 This contribution is revised from R1-1718716.
Quasi Co-Location
The following is one example option.
SSB and PRACH Reciprocity (and use of reciprocal spatial QCL) in UE between received SS-block and NR-RACH preamble transmission should not always be used, even if the UE is capable of beam correspondence. Examples are silent nodes, where at least one gNB is not transmitting SS-blocks but can detect NR-RACH preambles, and within heterogeneous networks where the transmit powers differs between several gNBs transmitting SS-blocks, see illustration in FIG. 3.

In these cases, the UE which is transmitting NR-RACH preambles based on beam correspondence and reciprocal spatial QCL from received SS-blocks, might transmit the NR-RACH preamble with a transmit power and with a beamforming in a non-reciprocal direction such that it is not detected at the node with best uplink link budget to the UE. In those scenarios, it is most likely better if the UE transmits the NR-RACH preamble with an as wide beam as possible instead of a narrow beam in the direction in which it received the SS-block. A configuration parameter can be included in a broadcast channel (indicating if the UE should transmit NR-RACH preambles based on reciprocity from received SS-block (if the UE is capable of doing that) or if the UE should use as wide beam as possible. This configuration can be included in Remaining System Information, RMSI, or in any other additional system information provided to UE as part of the RACH configuration.

Proposal 1: The network configures the UE if it should transmit NR-RACH preambles based on reciprocity from received SS-block (if the UE is capable of beam correspondence) or if the UE should use a wide beam.
SSB and RAR The following agreements were made regarding QCL between SSB and RAR:
Agreements in RAN1 #90b: UE may assume that the DMRS of PDCCH and the DMRS of PDSCH conveying Msg2 are QCL'ed with the SS block that the UE selected for RACH association and transmission With overlapping subsets of PRACH preamble indices, such as in a many-to-one association between SSB and PRACH preambles, the gNB cannot determine which SSB index was regarded as best received at the UE only from the received PRACH preamble. Instead the gNB only knows the set of SSB indices which are associated with the same set of PRACH preamble indices.

Figure 5:
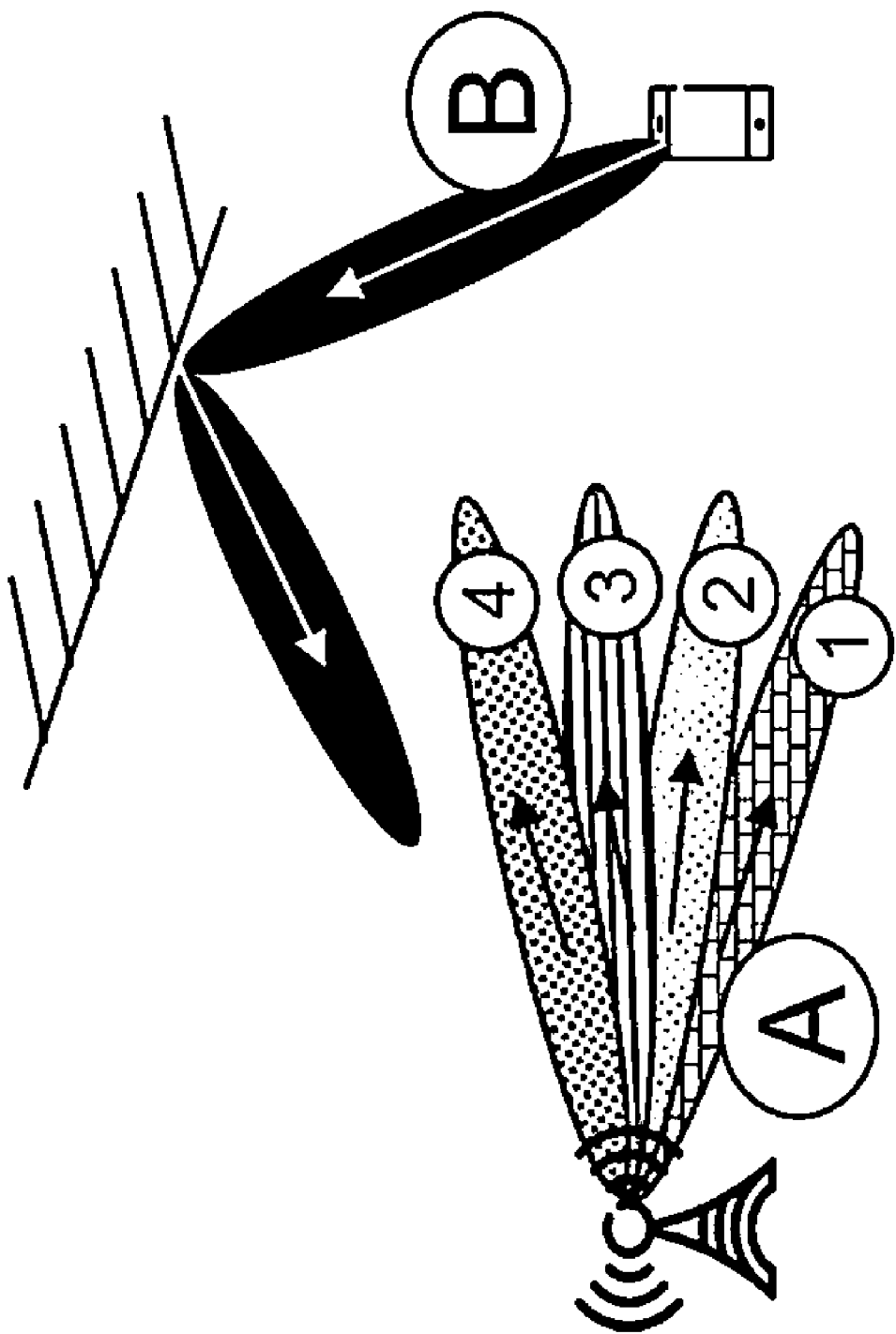
FIG. 5 illustrates an example of a network node transmitting several SSBs with different beamforming configurations, in accordance with some embodiments.

When the gNB has beam correspondence, it may determine the transmission beam to be used for RAR from the direction of the received PRACH preamble. Here, the gNB estimates best beamforming when receiving the PRACH preamble, and transmits the RAR in a beam corresponding to the received PRACH preamble beam. However, nothing prevents the UE from transmitting the PRACH preamble with another beamforming as compared to when receiving the SSB, see example in FIG. 5.

Figure 3:
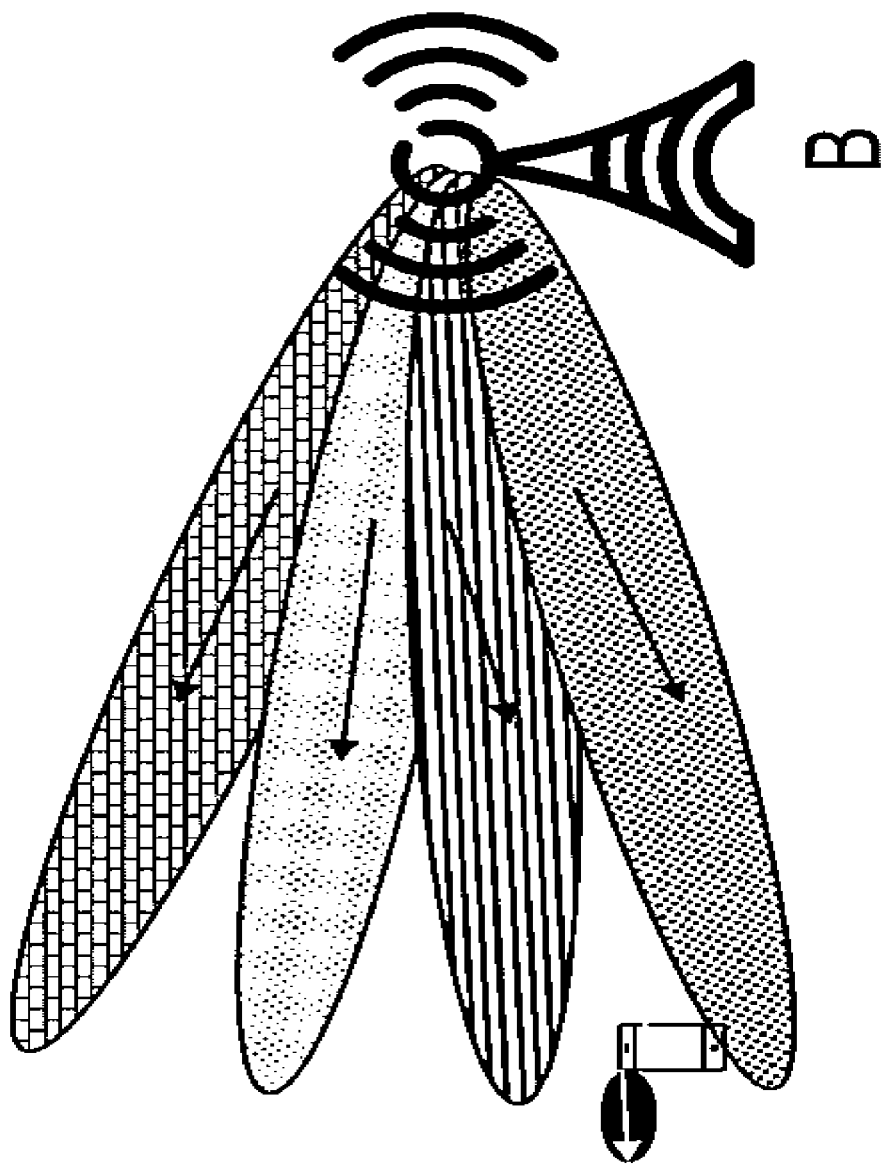
FIG. 3 illustrates an example of a silent node (node A) and a node transmitting SS (node B), in accordance with some embodiments.
Figure 4:
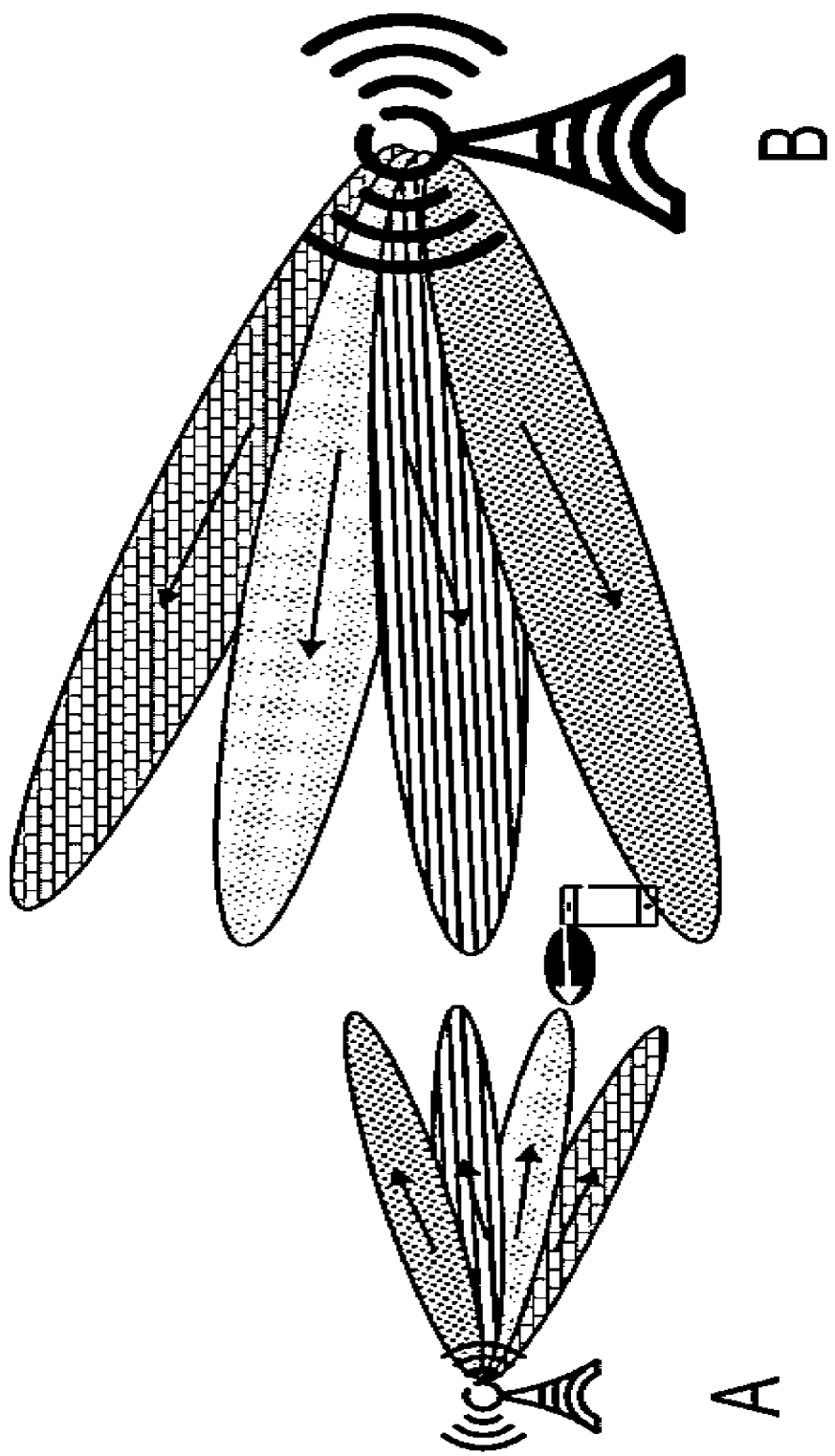
FIG. 4 illustrates an example of a heterogeneous, in accordance with some embodiments.

Here, the gNB transmit four SSBs (A) with different beamforming configurations, and the UE is for example receiving SSB number 2 as the best. However, the UE is transmitting the PRACH preamble (B), using another beamformer as compared to when receiving the SSB number 2. The UE might select other beamforming since it lacks reciprocity ability, i.e. it is not capable of reusing the identified receiver beamforming in transmitter beamforming. The UE might even use different antennas for receiving and transmitting. In the example of FIG. 3 the transmitted PRACH preamble is reflected in the physical environment between UE and gNB, such that the PRACH preamble arrives at the gNB from another direction as compared to the direction for which the SSB was transmitted to the UE. With overlapping subsets of PRACH preamble indices, as in a many-to-one mapping between SSBs and PRACH preamble, then the gNB doesn't know which of the SSBs (1-4) was the best for the UE. Thus, the gNB cannot transmit the RAR in a way so that it is received as spatially QCL with the SS block that the UE selected for RACH association and transmission.

Observation 1: The agreement of "DMRS of PDCCH and the DMRS of PDSCH conveying Msg2 are QCL'ed with the SS block that the UE selected for RACH association and transmission" may be violated with overlapping subsets of PRACH preamble indices between SSBs.

The agreement of QCL between SSB and RAR can only be supported without overlapping subsets of PRACH preamble indices between SSBs. With overlapping subsets, the UE should either not assume any QCL between RAR and SSB, or it might assume QCL between transmitted PRACH preamble and received RAR.

Proposal 2: RAR is QCL with SSB, for non-overlapping subsets of PRACH preamble indices and
RAR is QCL with PRACH preamble for overlapping subsets of PRACH preamble indices.

In NR, there are deployment scenarios with possible large timing offsets between received default SS block and the RAR NR-PDCCH, where the synchronization signal in SSB may not be suitable for receiving the RAR. These effects are discussed in more detail in [1] where we show that timing and frequency offsets may be created where the NR-PDCCH detection performance will deteriorate.

In another option, the following is considered.

A silent node deployment scenario may cause large timing errors to the closest pico node in the example deployment, also significantly degrading NR-PDCCH reception. Furthermore, spatial transmission patterns may differ. For example, the SS Block could be transmitted using multiple beams (e.g. to support PRACH processing) while the RAR message is sent via a wide PCI-based beam. Thus, in some deployments, NR-PDCCH carrying RAR indication may not be reliably received using the default SSB as the sync source. Since the SS-block might be transmitted by another node as compared to RAR, the UE should in some cases not assume any QCL (Quasi Co-Location) of SS-block and RAR, i.e. the UE may not assume that the SS block and RAR are similar with respect to Doppler shift, Doppler spread, delay spread, average delay, and/or spatial properties.

In [1], a network setup is described where the NW can transmit one or more SSB time indices as a wide-beam or cell-covering transmissions that are QCL (i.e. can be used as the sync reference) for access-related signals (RMSI, RAR, paging, etc.) while remaining time indices can be narrowly beamformed to provide higher-resolution beam direction info during access or to support active mode procedures; they can also be dynamically activated and configured. This is possible since existing agreements allow the NW to flexibly configure SSB transmissions for the different sweep time indices—it is not necessary to use the same beam width or power for all transmissions, or contiguous directions.

Proposal 3: NR should support QCL association of RAR signals with suitable subsets of SSB transmissions during an SSB burst.

In order to enable the SSB-based additional sync provision mechanism, the relevant QCL relationships and/or the use of off-grid SSBs must be signaled to the UE in order for the UE to configure system access, paging, or measurement signal reception with proper SSB reference and QCL assumptions. For RAR, the suitable UE receiver configuration with regard to SSB QCL relations can be indicated in RMSI. SIB1 thus configures the UE to use appropriate (QCL) SSB instances for relevant PDCCH/PDSCH reception.

Proposal 4: RMSI indicates which time indices in the default SSB sweep should be used as QCL reference for PDCCH/PDSCH reception for RAR.

Proposal 5: RAN2 should define the contents of the SIB1 fields specifying RAR-SSB QCL properties.

Random Access Response

RAR Contents

Random Access Preamble ID (RAPID)

The following agreements were made regarding contents of RAPID:

Agreements in RAN1 #90bis:
Bit field length of RAPID is fixed in the spec.
(working assumption) Bit field length of RAPID is 6 bits.
RAN1 is discussing if 8 bits should be considered for bit field length of RAPID
FFS the impact of SUL The following agreements are related to RAPID in RAN2-99bis:

Agreements in RAN2 #99bis:
1. As in LTE, two bits (T/E) are used and 6 bits RAPID In LTE, as there are 64 preambles per cell, the size of RAPID is 6 bits, which also served the purpose that MAC sub-header is octet-aligned. In NR, there might be a need for more than 64 preambles per cell and this means more than 6 bits is needed to convey the detected PRACH preamble in RAR. To deal with this issue, we propose that RAPID indicates a preamble index per SSB index, and instead indicate the SSB index using scrambling, i.e. including SSB index into RA-RNTI. Also, if more than 64 preambles are configured for each SSB, then the 6 LSB (Least Significant Bits) of the PRACH preamble index can be included in the RAPID Proposal 6: Confirm the working assumption that the size of RAPID field is 6 bits and defined as the 6 LSB bits of the PRACH preamble index.

Timing Advance command

The following agreements were made regarding contents of TA:

Agreements in RAN1 #90b:
Maximum size of TA command for RAR is 12 (as a working assumption) bits.
(Working assumption) For the timing advance in RAR, its granularity depends on Subcarrier spacing of the first uplink transmission after RAR The estimated TA resolution depends on sub carrier spacing of PRACH preamble (as shown in FIG. 27). The UL grant field within the DCI are not agreed yet within 3GPP. As there is only one RACH procedure at a time, there is no need of HARQ process id in UL grant of RAR.

Proposal 7: Confirm the working assumption for TA granularity, which depends on the subcarrier spacing of the first uplink transmission after RAR.

Detailed analysis of the number of bits needed for the TA command is made in [4], where we included the effect of subcarrier spacings of Msg1, Msg3, and PRACH formats. Some of the observations and proposals are as follows:

Proposal 8: Support two different TA sizes for RAR:
5 bits for PRACH formats A0, A1, and B1 (small cells), and
12 bits for remaining PRACH formats (normal cells)

Multiplexing of RARs within a MAC PDU is supported with proposed TA size of 5 or 12 is dependent on configured PRACH formats since one PRACH format is configured per cell.

Uplink-Downlink Frame Timing in LTE and NR

The TA and the relation to the TA offset as defined in LTE is discussed in detail within the appendix in section 9. For NR this time for UL/DL switching can be considered in TA command itself.

Proposal 9: The TA command will set the timing advance and provide for sufficient time for UL/DL switching when needed UL Grant UL grant depends on the DCI sizes and thereby on the resource allocation unit size (RBG size), which are still under discussion in RAN1 in '7.3 Remaining Details on Scheduling/HARQ aspects' agenda item. Accordingly, the UL grant size decision can be left to Scheduling/HARQ team.

Observation 2: UL grant size depends on the DCI size and resource allocation unit size, which can be left to control channel session (Scheduling/HARQ agenda item)

TC-RNTI

There is a discussion ongoing in RAN2 regarding at least three different RNTI's

C-RNTI: unique identification, which is used as an identifier of the RRC Connection and for scheduling
TC-RNTI: identification used for the random-access procedure
I-RNTI: unique identification used to identify the UE context for RRC_INACTIVE All these three entities might be related to one another and therefore, we propose to leave the decision of exact size of TC-RNTI to RAN2.

Proposal 10: RAN1 proposes RAN2 to decide on the size of the TC-RNTI

Indication of Detected PRACH Preamble

The RAR should contain an indication of detected PRACH preamble. In LTE [3GPP TS 36.321, section 5.1.4], the CRC for the PDCCH is scrambled by using the RA-RNTI as given by the formula $$RA\text{-}RNTI = 1 + t\_id + 10 * f\_id$$

where t_id is the index of the first subframe of the specified RACH ($0 \leq t\_id < 10$) within one radio frame of 10 ms, and f_id is the index of the specified RACH within that subframe, in ascending order of frequency domain (0≤f_id<6).

In NR, the RA-RNTI could be computed in a similar manner but with some modifications. For example the slot should be used in t_id to handle different transmission lengths of sub-carrier spacings. This would also mean the "10" should be replaced by the number of slots in a radio frame for the sub-carrier spacing used. For example with a sub carrier spacing of 120 kHz for PRACH preambles, there are 80 slots per radio frame.

The RAPID within RAR should fit into one octet (8 bits), together with extension and type bits, according to a RAN2 agreement. Here, it is proposed that the RAPID should include the 6 LSB bits of the PRACH preamble index for each SSB. Thus, if the number of PRACH preambles per SSB is larger than 64, then the remaining bits of the PRACH preamble index has to be signalled by other means than the RAPID. One straightforward possibility if to include these MSB bits of the PRACH preamble index into the RA-RNTI.

Let $2^{(n\_(bits,RA))}$ denote the maximum number of PRACH preambles that can be configured for each SSB, which can be written with n_(bits,RA) bits. The RAPID is indicating the n_(bits,RAPID)=6 LSB of the preamble index. The number of remaining bits can then be denoted as the n_(bits,RA-RNTI)=(n_(bits,RA)−6) bits which is the MSB (Most Significant Bits) of the PRACH preamble index. Denote n_(R,RA) as the value of the n_(bits,RA-RNTI) MSB bits of the preamble index. Then the value of n_(R,RA) can be include in RA-RNTI.

Without support for overlapping subsets between RACH preambles associated to SSBs, the RA-RNTI can be calculated as $$\text{RA-RNTI}=1+\text{slot\_id}+X*\text{SSB\_index}+X*Y*n\_(R,RA)+X*Y*Z*f\_\text{id}$$

where
- X=80, i.e. a design which supports at least 80 slots per frame corresponding to 120 kHz SCS in uplink and maximum RAR window length of one frame. If the maximum RAR window length is larger than 10 ms, then this value of X has to be increased.
- Y=64, i.e. the number of SSBs per SSB burst set.
- Z=the maximum number of MSB bits of the preamble index to be included in RA-RNTI.

For example, if a maximum of 128 PRACH preambles are supported and RAPID is 6 bits, then n_(bits,RA)=7 and n_(bits,RA-RNTI)=1 MSB of the preamble index is included in RA-RNTI such that Z=2 or Z=$2^{(n\_(bits,RA-RNTI))}$.

In another example, a maximum of 512 PRACH preambles are supported and RAPID is 6 bits, then n_(bits,RA)=9 and 3 MSB of the preamble index is included in RA-RNTI such that Z=8.

However, with overlapping subsets of PRACH preamble indices, such as in a many-to-one association between SSB and RACH preambles, then the gNB cannot identify the best SSB (as detected by UE) based on detected RACH preamble. Instead the gNB will only know the group of SSBs which are associated to the same set of RACH preambles. If we define an index for each such group of SSBs, associated to the same set of RACH preambles, as an "RACH_group_index", then we can include that association group index into the RA-RNTI. Thus, the definition of RA-RNTI depends on if RAN1 decide to support for overlapping subsets between RACH preambles associated to SSBs.

With support for overlapping subsets between RACH preambles associated to SSBs, the RA-RNTI can be calculated as $$\text{RA-RNTI}=1+\text{slot\_id}+X*\text{RACH\_group\_index}+X*Y*n\_(R,RA)+X*Y*Z*f\_\text{id}$$

With a one-to-one association between SSB index and PRACH preambles, then the "RACH_group_index" equals the SSB index. With a many-to-one mapping between SSB and PRACH preambles, then several SSBs are associated with the same set of RACH preambles. The SSBs which are associated with the same set of RACH preambles are then labeled with the same "RACH_group_index". The UE monitors RAR for a RAR transmitted with an RA-RNTI with the RACH group index in which the detected SSB is included.

With a RA-RNTI which depends on SSB group index, then only RACH preamble index associated with the same group of SSBs can be multiplexed into the same RAR. This supports beamforming of RAR with the same beamforming as used for the SSB.

An RNTI which depends on RACH groups or SSB index results in a possibility to send independent Backoff Indicators (BI) in different beams, where each beam corresponds to a group of RACH preambles and thus also to one, or a group of, SSBs.

Proposal 11: With only support for non-overlapping subsets of PRACH preambles between SSBs, then the RA-RNTI is based on:
- SSB index,
- slot index,
- frequency index and
- (N−6) MSB bits of the PRACH preamble index, where $2^N$ is the configured number of PRACH preambles per SSB.

Proposal 12: With support for overlapping subsets of PRACH preambles between SSBs, then the RA-RNTI is based on
- PRACH preamble group,
- slot index,
- frequency index and
- (N−6) MSB bits of the PRACH preamble index, where $2^N$ is the configured number of PRACH preambles per SSB.

RAR Transmission

There has been agreement in RAN1 #90b to support only Single Msg1 for Rel 15 for contention-based RACH. Our views on multiple Msg1 for contention-free RACH are discussed in [5].

Non-Slot Based Scheduling of PDCCH for RAR

The following agreements were made related to RAR transmission:

Agreements in RAN1 #90:
- At least for initial access, RAR is carried in NR-PDSCH scheduled by NR-PDCCH in CORESET configured in RACH configuration
  - Note: CORESET configured in RACH configuration can be same or different from CORESET configured in NR-PBCH Agreements in RAN1 #AH3:
- NR supports at least slot based transmission of Msg2, Msg3 and Msg4
  - Check if slot based scheduling can satisfy ITU requirement. If not, investigate ways to meet ITU requirement, e.g., non-slot based transmission of Msg2, Msg3 and Msg4

Agreements in RAN1 #90b:
NR supports both slot based PDCCH, PDSCH and PUSCH, and non-slot based PDSCH/PUSCH transmissions for Msg2/Msg3/Msg4 transmission
  For the non-slot based transmission, 2, 4 and 7 OFDM-symbol durations for the PDSCH/PUSCH is supported
  FFS the handling of PDCCH for non-slot based transmissions
  FFS Time gap during RACH procedure applied to non-slot based transmissions
  Note: Whether to support simultaneous uplink transmission of slot and non-slot based transmission from UE's perspective will be finalized in the control channel session We propose to have possibility of RAR transmission in non-slot based scheduling (interpreted as mini-slots in the text below) besides the slot based scheduling. Scheduling RAR in non-slot based scheduling is especially beneficial for supporting low latency and for reducing the resource overhead.

Low Latency:
  Transmitting in non-slot based scheduling gives the possibility of reducing the time for the successful RACH procedure as PDSCH transmissions can happen much faster. A detailed analysis is provided in [7], which analyses that slot-based scheduling will meet CP latency requirements of 20 ms in some configurations for fastest option but meeting 10 ms is a challenge for CP latency especially for average latency analysis.
  For analog beamforming, if RAR is transmitted in non-slot based scheduling, then beam sweeping in different directions is possible in very short time compared to the case when RAR is transmitted with slot based scheduling.
  It is beneficial for supporting low latency even in the case of digital beamforming when RAR is sent by non-slot based scheduling.

Reduction of Resource Overhead:
  When RAR is sent by slot based scheduling, then rest of the frequency resources in a time interval are only usable for UEs in the same direction as the transmitted RAR, when analog beamforming is performed. Instead in this scenario, it is better to allocate many of the frequency resources to RAR and reduce the time interval by non-slot based scheduling of RAR. This serves purpose of using most of the time-frequency grid in a resource efficient way.
  The RAR can be frequency multiplexed with an SS block if the RAR support non-slot based scheduling. This reduce overhead since sub-carriers outside the SS block allocation can then be used with an analog transmitted beamforming. Typically, a RAR can then be transmitted simultaneously and, with analog transmitter beamforming, in the same direction as a frequency multiplexed SS block.

Proposal 13: Support RAR transmissions in non-slot based scheduling (i.e., mini-slot) of PDCCH in addition to already agreed non-slot based scheduling of PDSCH/PUSCH.

CORESET for RAR
The RAR (message 2) CORESET configuration indicates the resource of the PDCCH that schedules the PDSCH carrying RAR. The message 2 CORESET configuration, including at least the bandwidth (PRBs), frequency position, CORESET duration/OFDM symbols, can be configured with the following two options:

Option 1: Use the same CORESET configuration as for RMSI indicated in PBCH.
Option 2: A dedicated message 2 CORSET configured by RMSI.

With option 1, the same CORESET configuration is reused for RMSI and message 2, which simplifies the design and reduces the payload size of RMSI. Option 2 provides better configuration flexibility.

To simplify the design, and considering that the PDCCH that schedules the RMSI and the PDCCH that schedules the message 2 have the same property, that is, carrying a relatively small amount of control information simultaneously received by multiple UEs. We propose to select option 1 for message 2 CORESET configuration.

Note that the details of the message 2 CORESET configuration, e.g., the set of aggregation levels and the candidates per aggregation level for PDCCH scheduling message 2 can be decided in the control channel session.

Proposal 14: The message 2 CORESET configuration is the same as the CORESET configured for RMSI by PBCH.

RAR Window Length
There is an agreement regarding the start of the RAR window from the end of the preamble transmission:
  Agreements in RAN1 #90:
  For single Msg1 RACH, the RAR window starts from the first available CORESET after a fixed duration from the end of Msg1 transmission
    The fixed duration is X T_s
    X is the same for all RACH occasions
  For a single Msg1 RACH from UE,
    The size of a RAR window is the same for all RACH occasions and is configured in RMSI
    RAR window could accommodate processing time at gNB.
      Maximum window size depends on worst case gNB delay after Msg1 reception including processing delay, scheduling delay, etc
      Minimum window size depends on duration of Msg2 or CORESET and scheduling delay
    FFS: multiple Msg1 RACH case if supported
  Agreements in RAN1 #AH3:
  For RAR, X can be supported for the timing gap between the end of MSg1 transmission and the starting position of the CORESET for RAR
    Value of X=ceiling($\Delta$/(symbol duration))*symbol duration, where the symbol duration is based on the RAR numerology
      Where $\Delta$ is to accommodate sufficient time for UE Tx-Rx switching if needed (e.g., for TDD)
      Note: UE Tx-Rx switching latency is up to RAN4

Design Principles for RAR Window Length
According to the above agreement, we need to make sure that the processing time at the gNB has to be accommodated in the RAR window length. This will impact the maximum RAR window length, but is not any issue if at least the same RAR window length as in LTE is supported.
The following concepts are also different compared to LTE, which will impact the RAR window length
  Short PRACH preamble formats of only 1 OFDM symbol.
  Periodicity of PRACH configuration
    LTE: Configurable between every subframe up to every 2nd frame
    NR: Still ongoing discussion: for example, configurable between every subframe up to every 16th frame [6]

Number of PRACH preambles per cell in NR, is still ongoing discussions in 3GPP, and can be configured to be much higher than in LTE, which might impact capacity of RAR (i.e., how many RARs can we send within RAR window at a time)

Start of the RAR window
  In LTE:
    3 subframes after end of RACH preamble transmission
    gNB processing time also accounted within start of RAR window
  In NR:
    accounting only for the UL-DL switch
    gNB processing time should be accounted for in length of RAR window Shortest RAR Window Length:

In LTE, RAR window length can be configured between 2 subframes up to 10 subframes [parameter ra-Response-WindowSize, Section 6.3.2 of 36.331-e40]. However, in NR, we need to revisit this concept especially since the periodicity of PRACH preamble might be different than in LTE, and to support low latency use case. There are two different scenarios where we see that a too long RAR window length is not desirable. This is especially important when we want to have a configurable case of low latency support in these scenarios:

When the RAR is not received by the UE, the UE follows power ramping as described in Section 50. If the RAR window is too long, this power ramping procedure will impact the overall time for the RACH latency. This power ramping follows when the PRACH preamble must be retransmitted due to no RAR received in UE.

When there is no beam correspondence at the UE, then the UE might need to do a transmit beam-sweeping of PRACH preambles. A retransmission of PRACH preambles for CBRA is only allowed after the end of the RAR window. This might take a lot of time and is not desirable for low latency applications.

Since there is proposal of having PRACH preamble in every subframe [6], and as there are already some agreed short preamble formats with few OFDM symbols long, we propose that there is one configuration, where the RAR window length is ½ slot, i.e. 7 OFDM symbols. With this configuration, and a very short PRACH preamble format such as A0, A1 or A2, it is possibly, at least in theory, to transmit both a PRACH preamble from UE and a RAR from gNB in every subframe.

Proposal 15: Shortest RAR window length is ½ slot, suitable for low latency applications and to be future-proof.

Longest RAR Window Length:

Based on the discussion in for Design principles for RAR window length, we have the following observations related to the longest RAR window length.

Observation 3: Number of PRACH preambles per cell in NR can be configured to be much higher than in LTE.

In NR, gNB processing time needs to be accounted for in the length of RAR window. Having a long RAR window would be good from gNB perspective as it gives gNB large flexibility when to schedule RAR but this is not good from the perspective of latency of the RACH procedure. Having a short RAR window is good for the latency of the average RACH procedure (even in case of failures of PRACH preambles in first attempts) but this short RAR window will imply requirements on the gNB to process PRACH preambles faster and send RAR.

As discussed, the number or PRACH preambles can be configured to be higher than in LTE. If that is the case, then the number of UEs that can be supported in a cell can be higher than in LTE. If so, then the number of RARs that can be handled at a given time might be increased, which would affect the RAR window length. Thus in NR we might be need to have a much longer RAR window than what would have been in LTE. The maximum RAR window length needs some analysis based on the above discussion points and therefore, we propose the following.

Proposal 16: Support maximum RAR window length of at least 10 subframes.

Time Gap Between Message 2 and Message 3

For example, agreements in RAN1 #AH2 and RAN1 #90b (as shown in FIGS. 25 and 26) taken in control channel session that affects the minimum gap that we can have between Msg2 and Msg3.

Agreements in RAN1 #AH2:
  For NR, RAN1 should consider the UE processing time(s) in terms of symbols (N1, N2) together with absolute time (in us), instead of slots (K)
    N1: the number of OFDM symbols required for UE processing from the end of NR-PDSCH reception to the earliest possible start of the corresponding ACK/NACK transmission from UE perspective.
    N2: the number of OFDM symbols required for UE processing from the end of NR-PDCCH containing the UL grant reception to the earliest possible start of the corresponding NR-PUSCH transmission from UE perspective.
    Note the timing advance is not included in N1 and N2
      FFS whether other aspects, e.g. UE UL/DL switching time, etc. are included in N1 and N2
    FFS between the following for each combination defined in the next slide
      Opt 1: UE reports N1 and N2 as UE capability
      Opt 2: Fixed values of N1 and N2
    UE is not expected transmit anything in uplink if the network set the values of K1 and/or K2 without leaving sufficient time for UE processing Agreements in RAN1 #90b:
  Finalize Table 1 as the baseline UE processing time capability in NR Release 15 at least for slot-based scheduling in the non-CA case with single numerology for PDCCH, PDSCH, and PUSCH.
  Finalize Table 2 as the aggressive UE processing time capability in NR Release 15 at least for slot-based scheduling in the non-CA case with single numerology for PDCCH, PDSCH, and PUSCH.
    FFS: if reduced processing time is achieved with a semi-statically reduced bandwidth and throughput capability relative to the peak rate supportable by the UE.

As can be seen from above agreement, N2 is the parameter which dictates the minimum gap between Msg 2 and Msg3. Note however that N2 is the gap between PDCCH and PUSCH, while the uplink grant for Msg3 is carried by RAR in a PDSCH. Also, the transmission of Msg3 is done before the UE can report its capabilities to the gNB.

Proposal 17: Leave the decision to the control channel session as they are already discussing on N2, which is the minimum gap between Msg2 and Msg3.

Message 3 and Message 4

The following agreements regarding Msg3 were agreed on:
  Agreements in RAN1 #90b:
    Msg3 is scheduled by the uplink grant in RAR
    Msg3 is transmitted after a minimum time gap from the end of Msg2 over-the-air reception gNB has the flexibility to schedule the transmission time of Msg3 while ensuring the minimum time gap
FFS the minimum time gap w.r.t. UE processing capability
NR supports RACH configuration in RMSI containing 1 bit to convey SCS of Msg3
In sub-6 GHz, subcarrier spacing of Msg3 can be either 15 or 30 kHz
In over-6 GHz, subcarrier spacing of Msg3 can be either 60 or 120 kHz
NR supports asynchronous adaptive HARQ retransmissions for RACH message 3.
UE may assume that the DMRS of PDCCH conveying Msg3 retransmission grant is QCLed with the SS block that the UE selected for RACH association and transmission
If there is no beam reporting in RACH message 3, UE may assume that the DMRS of PDCCH and the DMRS of PDSCH conveying Msg4 are QCL'ed with the SS block that the UE selected for RACH association and transmission
FFS: Whether to support beam reporting in Msg3
FFS: If and how beam reporting in RACH message 3 impacts message 4 Tx QCL assumption
HARQ process ID for Msg3 PUSCH retransmission is fixed in the spec.
HARQ process ID for Msg3 PUSCH retransmission is fixed as 0 index.

There is no formal agreement that Msg3 is ordinary PUSCH. Thus, we propose the following agreement.

Proposal 18: Message 3 is based on PUSCH, specified by uplink grant in RAR

In the above agreements, there are two FFS regarding beam reporting in msg3. As this topic has not been enough discussed in Initial access session we propose the following.

Proposal 19: Do not support beam reporting in Msg3 within Rel 15, given the time constraints to finalize Rel 15 specifications.

PRACH Power Ramping
In RAN1 #89, the following agreements on PRACH power ramping were reached:
Agreements:
If the UE conducts beam switching, the counter of power ramping remains unchanged
FFS: UE behavior after reaching the maximum power
RAN1 will definitely decide above FFS point
Agreements:
NR does not support to report UE capability of beam correspondence during RACH procedure.
Note that UE capability of beam correspondence is reported after RACH procedure
In RAN1 NR AH #2, further agreements on PRACH power ramping were reached:
Agreements:
The UE calculates the PRACH transmit power for the retransmission at least based on the most recent estimate pathloss and power ramping
The pathloss is measured at least on the SS block associated with the PRACH resources/preamble subset
UE behavior when reaching the maximum power
If the recalculated power is still at or above the Pc,max
The UE can transmit at maximum power even if it changes its TX beam In RAN1 #90, further agreements on PRACH power ramping were reached:
Agreements:
SS block selection
It is up to UE implementation how to select the SS block and corresponding PRACH resource for pathloss estimation and (re)transmission based on SS blocks that satisfy threshold(s)
If UE does not detect a SS block that satisfy threshold(s), it has the flexibility to select any SS block that allows UE to meet the target received power of the RACH preamble with its maximum transmit power
UE has a flexibility to select its RX beam to find the list of SS blocks that satisfy the threshold(s)
FFS: whether threshold(s) for SS block selection is configured or fixed in the spec
Counter of power ramping when UE changes its selected SS-block in message 1 re-transmission is unchanged
SS block Tx power and RA Power control
UE computes pathloss based on "SS block transmit power" and SS block RSRP
At least one "SS block transmit power" value is indicated to UE in RMSI
FFS: whether and how to support multiple values
Note: different SS blocks in an SS burst set can be transmitted with different power and/or with different Tx beamforming gain at least as NW implementation
Maximum Number of PRACH Transmission
NR supports the total maximum number of transmissions, M (like
Previous meetings have made decisions about the PRACH preamble as well as the 4 step RA procedure. Some aspects of power ramping in the PRACH Msg. 1 still remain to be agreed.

The choice of the SSB and the corresponding resource set for initial PRACH transmission is a critical element for ensuring efficient system access and minimizing its impact on the UL capacity of the network. According to a recent agreement, the choice of the SSB is up to the UE, subject to the link corresponding to the SSB satisfying an absolute quality threshold criterion. The aim of the procedure is to ensure that the UE can find and proceed with a sufficiently good SSB in a relatively short time, while avoiding hasty PRACH transmission in response to a low-quality SSB or waiting excessively long time to ensure that all possible SSB in the area have been evaluated.

One remaining issue is the choice of the threshold and the maximum number of reception attempts if the threshold is not reached by the SSBs received so far. It has been agreed that the threshold for SSB link quality acceptance for PRACH transmission should be configurable by the network. In order to ensure power-efficient operation, the UE continues detecting and measuring SSBs until an SSB satisfying the threshold is found. If no such SSB is found during the SSB repetition period of the network, the UE determines which of the detected SSB to respond to with PRACH. This is subject to being able to close the link budget given the path loss associated with the SSB. The typical choice would be to use the strongest detected SSB.

Proposal 20: If no SSBs are detected satisfying the threshold, the UE continues SSB detection during a time duration equal to the SSB period.

A retransmission of the RACH preamble is needed if the UE is unable to decode a RAR. It is up to UE implementation to decide if it retransmits a preamble in a set of preambles corresponding to previously used SSB or change to preambles associated with another SSB. If the UE use the preamble set corresponding to the previously used SSB, then the power ramping as decided in RAN1 #89 is used (i.e. if the UE conducts beam switching, the counter of power ramping remains unchanged). If on the other hand, the UE decides to use a preamble set associated to another SSB, then the UE should base the path loss estimation based on this new SSB.

Proposal 21: It should be up to UE implementation to determine whether to continue ramping on the same SSB (and the same set of preambles) or to change the SSB.

Proposal 22: For each SSB (and the associated set of preambles), the UE should base the PRACH preamble TX power on the path loss derived from the RSRP estimate associated with that SSB.

By agreeing that beam switching leaves the power ramping unchanged, it is possible to envision a functionality that is similar to that of LTE [8][9]. What differs is the number of antennas and the resulting beamforming they may produce and the possibility for beam correspondence or not. Below, the power ramping discussion is divided into three sections: Initialization, incrementation and termination.

The key performance indicators for random access are twofold:
to minimize transmitted interference, and,
to minimize random access latency.

Hence, a "first shot right" is desirable although often unrealistic. For the two UE types with and without beam correspondence, it is respectively more and less likely to achieve this. For this reason, requirements for UEs with beam correspondence could be made stricter but also more predictable in order to achieve a faster PRACH procedure. This is possible without the serving cell knowing about the UE capability in this respect.

Observation 4: The behavior of UEs with beam correspondence may be more strictly defined in order to achieve a more efficient PRACH procedure.

One such stricter definition is the decision of which beam to use in the UL in UEs with beam correspondence. Reasonably, the corresponding beam to the DL beam is the preferred choice.

Proposal 23: A UE with beam correspondence should use same corresponding beam in UL as in DL.

If the UE is transmitting at maximum power and does still not to receive a Random Access Response (RAR), or a received RAR does not contain a preamble identifier corresponding to the transmitted RA preamble, the random access cycle has been unsuccessful. Such a situation could either depend on the UE being out-of-coverage for the serving cell, or due to the UE using too wide beamforming or beamforming pointing in the wrong direction.

Similar to LTE, following a failed full random access cycle, a random back-off period that must pass before the UE may initiate another random access cycle, possibly with different beamforming directions, should be defined.

Proposal 24: In case of a failed random access cycle, a random back-off period must pass before the UE may attempt another random access cycle.

Furthermore, the new PRACH attempt should be starting over with the initial power values.

Proposal 25: In case of a failed random access cycle, the PREAMBLE_TRANSMISSION_COUNTER is reset.

Message 3 Power Settings

Within Msg. 2, the UE will receive a UCI, including UL power control [10]. In order for that to be purposeful, and for a UE to optimize its Msg. 3 transmission, it should be obliged to follow the UCI in Msg. 2.

Proposal 26: The UE shall adjust its power setting for Msg. 3 with respect to the Msg. 2 UCI.

Another aspect of Msg. 3 in relation to Msg. 1 is the UE antenna configuration. For example, in mmW, it is possible to envision UEs with different antenna panels where only a subset of the panels is used at a time. In order to get a predictable and relevant result from such UEs, it is important that the same antenna configuration is used in Msg. 3 as was used for Msg. 1.

Proposal 27: The UE shall use the same antenna configuration in Message 3 as in Message 1.

Using the same beam configuration can be seen as being part of Proposal 27. Nevertheless, if the UE is allowed to change beams between Msg. 1 and Msg. 3, in order to obtain a predictable and relevant result, the UE should adjust the beam forming gain accordingly.

Proposal 28: If a UE is allowed to change beams between Msg. 1 and Msg. 3, any change in processing gain arising from such beam change must be included in the power control formula.

CONCLUSION

Summary of Observations

Observation 1 The agreement of "DMRS of PDCCH and the DMRS of PDSCH conveying Msg2 are QCL'ed with the SS block that the UE selected for RACH association and transmission" may be violated with overlapping subsets of PRACH preamble indices between SSBs.

Observation 2 UL grant size depends on the DCI size and resource allocation unit size, which can be left to control channel session (Scheduling/HARQ agenda item)

Observation 3 With short preamble of 1-2 OFDM symbols and with PRACH preamble configured every slot, we can have a RAR window length of less than a slot Observation 4 Number of PRACH preambles per cell in NR can be configured to be much higher than in LTE.

Observation 5 The behavior of UEs with beam correspondence may be more strictly defined in order to achieve a more efficient PRACH procedure.

Summary of Proposals

Proposal 1 RAR is QCL with SSB, for non-overlapping subsets of PRACH preamble indices and RAR is QCL with PRACH preamble for overlapping subsets of PRACH preamble indices.

Proposal 2 Confirm the working assumption that the size of RAPID field is 6 bits and defined as the 6 LSB bits of the PRACH preamble index.

Proposal 3 Confirm the working assumption for TA granularity, which depends on the subcarrier spacing of the first uplink transmission after RAR.

Proposal 4 Support two different TA sizes for RAR: 5 bits for PRACH formats A0, A1, and B1 (small cells); and TA size of 12 bits for rest of the PRACH formats (normal cells)

Proposal 5 The TA command will set the timing advance and provide for sufficient time for UL/DL switching when needed Proposal 6 RAN1 proposes RAN2 to decide on the size of the TC-RNTI Proposal 7 Without support for overlapping subsets of PRACH preambles between SSBs, then the RA-RNTI is based on *SSB index, *slot index, *frequency index and

*(N−6) MSB bits of the PRACH preamble index, where 2^N is the maximum number of PRACH preambles associated to one SSB.

Proposal 8 With support for overlapping subsets of PRACH preambles between SSBs, then the RA-*RNTI is based on *PRACH preamble group, *slot index, *frequency index and *(N−6) MSB bits of the PRACH preamble index, where 2^N is the maximum number of PRACH preambles associated to one SSB.

Proposal 9 Support RAR transmissions in non-slot based scheduling (i.e., mini-slot) of PDCCH in addition to already agreed non-slot based scheduling of PDSCH/PUSCH.

Proposal 10 Support CORESET starting positions aligned with both slot boundary and with non-slot boundary.

Proposal 11 Shortest RAR window length is ½ slot, suitable for low latency applications and to be future-proof.

Proposal 12 Support maximum RAR window length of at least 10 subframes

Proposal 13 Leave the decision to the control channel session as they are already discussing on N2, which is the minimum gap between Msg2 and Msg3

Proposal 14 Message 3 is based on PUSCH, specified by uplink grant in RAR

Proposal 15 We do not support beam reporting in Msg3, at least in Rel 15, given the time constraints to finalize Rel 15 specifications Proposal 16 If no SSBs are detected satisfying the threshold, the UE continues SSB detection during a time duration equal to the SSB period.

Proposal 17 It should be up to UE implementation to determine whether to continue ramping on the same SSB (and the same set of preambles) or to change the SSB.

Proposal 18 For each SSB (and the associated set of preambles), the UE should base the PRACH preamble TX power on the path loss derived from the RSRP estimate associated with that SSB.

Proposal 19 A UE with beam correspondence should use same corresponding beam in UL as in DL.

Proposal 20 In case of a failed random access cycle, a random back-off period must pass before the UE may attempt another random access cycle.

Proposal 21 In case of a failed random access cycle, the "PREAMBLE_TRANSMISSION_COUNTER" is reset.

Proposal 22 The UE shall adjust its power setting for Msg. 3 with respect to the Msg. 2 UCI.

Proposal 23 The UE shall use the same antenna configuration in Message 3 as in Message 1.

Proposal 24 If a UE is allowed to change beams between Msg. 1 and Msg. 3, any change in processing gain arising from such beam change must be included in the power control formula.

Uplink-Downlink Frame Timing in LTE and NR

Figure 23:
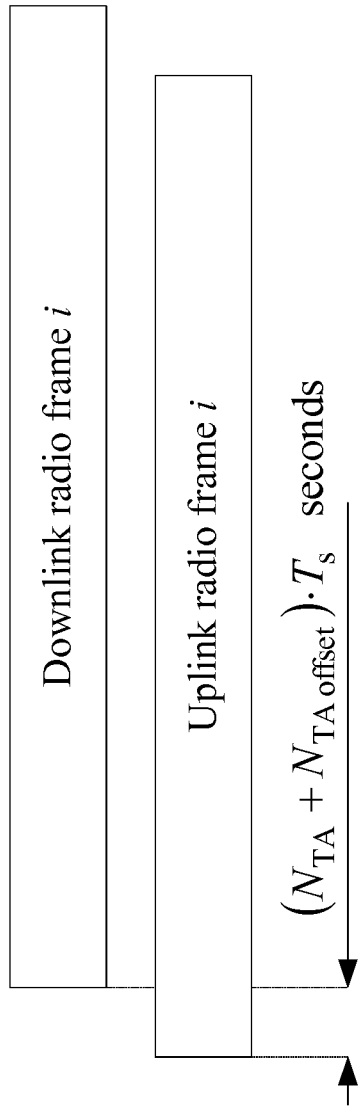
FIG. 23 illustrates an example of the timing of an uplink radio frame relative to a corresponding downlink radio frame in LTE, in accordance with certain embodiments.

In LTE [3GPP TS 36.211], the transmission of the uplink radio frame number i from the UE shall start $(N_{TA}+N_{TAoffset}) \times T_s$ seconds before the start of the corresponding downlink radio frame at the UE as shown in FIG. 23, where $0 \leq N_{TA} \leq 4069$ if the UE is configured with a SCG and $0 \leq N_{TA} \leq 20512$ otherwise. For frame structure type 1 $N_{TAoffset}=0$ and for frame structure type 2 $N_{TAoffset}=624$ unless stated otherwise in [4]. Note that not all slots in a radio frame may be transmitted. One example hereof is TDD, where only a subset of the slots in a radio frame is transmitted.

Note: $T_s=1/(30.72*10^6)$

Figure 24:
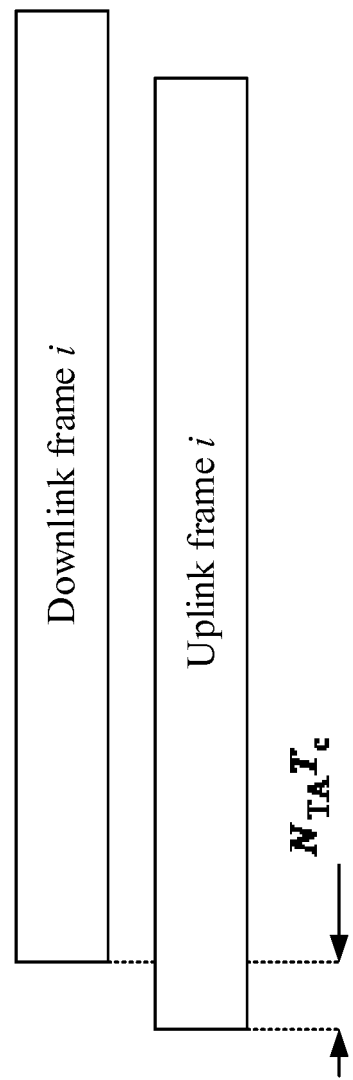
FIG. 24 illustrates an example of the timing of an uplink radio frame relative to a corresponding downlink radio frame in NR, in accordance with certain embodiments.

In NR, latest 38.211 v1.1.0 draft specification from RAN1 #90bis meeting, there's no TA offset description for downlink uplink switching. Only the TA is considered as shown in FIG. 24. Transmission of uplink frame number i from the UE shall start $T_{TA}=N_{TA}T_c$ before the start of the corresponding downlink frame at the UE.

Note: $T_c=T_s/64=1/(64*30.72*10^6)$

REFERENCES

[1] R1-1717761 "Additional synchronization provision", Ericsson, 3GPP TSG RAN WG1 #90bis, Prague, CZ, 9-13, Oct. 2017

[2] R2-1708193, "MAC RAR PDU Design", Ericsson, 3GPP TSG RAN WG2 Meeting #99, Berlin, Germany, 21-25 Aug. 2017

[3] R1-1719197, "Summary of Remaining Details on RACH Procedure", Qualcomm, TSG RAN WG1 Meeting #90bis, Prague, Czech Republic, Oct. 9-13, 2017

[4] R1-17xxxxx, "Two different TA sizes for RAR and saving of a byte", Ericsson, TSG RAN WG1 Meeting #91, Reno, Nevada, US, 27-1 Dec. 2017

[5] R1-17xxxxx, "Multiple Preamble Transmissions", Ericsson, TSG RAN WG1 Meeting #91, Reno, Nevada, US, 27-1 Dec. 2017

[6] R1-17xxxxx, "R1-17xxxxx_Remaining details on PRACH formats and configurations", Ericsson, 3GPP TSG RAN WG1 Meeting #91, Reno, Nevada, US, 27-1 Dec. 2017

[7] R1-17xxxxxx, "Impact of control plane latency reduction", Ericsson, 3GPP TSG RAN WG1 Meeting #91, Reno, Nevada, USA, 27 Nov.-1 Dec. 2017

[8] 3GPP TS 36.213. Evolved Universal Terrestrial Radio Access (E-UTRA); Medium Access Control (MAC) protocol specification (Release 12), March, 2016.

[9] 3GPP TS 36.321. Evolved Universal Terrestrial Radio Access (E-UTRA); Physical layer procedures (Release 12), September, 2016.

[10] R1-1711383, "4-step random access procedure", Ericsson, 3GPP TSG-RAN WG1 NR AH #2, Qingdao, P. R. China, 26-30 Jun. 2017

What is claimed is:

1. A method performed by a wireless device, the method comprising:
   initiating a random access procedure in which the wireless device sends a Physical Random Access Channel (PRACH) preamble to a network node; and
   applying a receiver configuration for receiving an access response, the receiver configuration determined based at least in part on whether a many-to-one association exists between (a) a downlink signal that, prior to the initiating the random access procedure, is used for beam selection, and (b) PRACH preamble indices, and
   configuring the wireless device with the many-to-one association via a dedicated RRC message that is indicative of at least one of: move the wireless device from connected state to idle or inactive state, or issue a handover command,
   wherein applying the receiver configuration comprises configuring receive weights for receiving the access response differently than receive weights used for receiving the downlink signal on a preferred beam based on the downlink signal and based on the PRACH preamble indices having the many-to-one association.

2. The method of claim 1, wherein the downlink signal that is used for beam selection comprises a Synchronization Signal Block, and a Channel State Information-Reference Signal.

3. The method of claim 1, wherein, when a one-to-one association exists between the downlink signal and the PRACH preamble indices, the receiver configuration assumes quasi co-location between the downlink signal and the access response, or wherein, when the many-to-one association exists between the downlink signal and the PRACH preamble indices, the receiver configuration does not assume quasi co-location between the downlink signal and the access response.

4. The method of claim 3, wherein the receiver configuration that does not assume quasi co-location between the downlink signal and the access response uses:

beam scanning to detect the access response, or a wider beam for the reception of the access response compared to the receiver configuration that assumes quasi co-location between the downlink signal and the access response.

5. The method of claim 1, wherein, when the many-to-one association exists between the downlink signal and the PRACH preamble indices, the receiver configuration is determined based on assuming a spatial correspondence between the access response and the PRACH preamble sent during the random access procedure.

6. The method of claim 1, wherein the determination whether the many-to-one association exists is based on at least one of:

broadcast information received from the network while the wireless device is idle or inactive, or dedicated signalling received from the network while the wireless device is connected, or wherein the dedicated signalling comprises any one of: a release message received via radio resource control signalling, or a handover command received via radio resource control signalling.

7. The method of claim 1, further comprising configuring receive weights for receiving the access response that are same as receive weights used for receiving the downlink signal on a preferred beam based on the downlink signal and the PRACH preamble indices having a one-to-one association.

8. A wireless device, comprising:

processing circuitry; and power supply circuitry configured to supply power to the wireless device, wherein the processing circuitry is configured to:

initiate a random access procedure in which the wireless device sends a Physical Random Access Channel (PRACH) preamble to a network node; and apply a receiver configuration for receiving an access response, the receiver configuration determined based at least in part on whether a many-to-one association exists between (a) a downlink signal that, prior to initiating the random access procedure, is used for beam selection, and (b) PRACH preamble indices, wherein the wireless device is configured with the many-to-one association via a dedicated RRC message that is indicative of at least one of: move the wireless device from connected state to idle or inactive state, or issue a handover command, and wherein applying the receiver configuration comprises configuring receive weights for receiving the access response differently than receive weights used for receiving the downlink signal on a preferred beam based on the downlink signal and based on the PRACH preamble indices having the many-to-one association.

9. A method performed by a base station, the method comprising:

transmitting information to a wireless device, the information indicating whether a many-to-one association exists between (a) a downlink signal that the wireless device uses for beam selection prior to a random access procedure, and (b) physical random access channel (PRACH) preamble indices;

transmitting one or more of the downlink signals that the wireless device uses for beam selection prior to the random access procedure;

receiving a PRACH preamble from the wireless device;

applying a transmitter configuration for transmitting an access response to the received PRACH preamble, the transmitter configuration based at least in part on whether the many-to-one association exists and on the received PRACH preamble, wherein applying the transmitter configuration comprises configuring the transmitter to use TX precoding weights, when transmitting the access response, that focus the access response energy in a direction of the PRACH preamble reception if the mapping between the downlink signal and the PRACH preamble indices comprises the many-to-one association, wherein, when the many-to-one association exists between the downlink signal and the PRACH preamble indices, the transmitter configuration transmits with spatial correspondence between the access response and the received PRACH preamble, and wherein the spatial correspondence uses a preferred PRACH settings to configure the access response transmission.

10. The method of claim 9, wherein the downlink signal that is used for beam selection comprises a Synchronization Signal Block, and a Channel State Information-Reference Signal.

11. The method of claim 9, wherein, when a one-to-one association exists between the downlink signal and the PRACH preamble indices, the transmitter configuration applies quasi co-location to the downlink signal and the access response, or wherein, when the many-to-one association exists between the downlink signal and the PRACH preamble indices, the transmitter configuration does not apply quasi co-location between the downlink signal and the access response.

12. The method of claim 11, wherein the transmitter configuration that does not apply quasi co-location between the downlink signal and the access response uses beam sweeping over all beams that map to the received PRACH preamble.

13. The method of claim 9, wherein the information is sent to the wireless device via at least one of broadcast messaging and dedicated signalling, wherein the dedicated signalling comprises:

a release message sent via radio resource control signalling, or a handover command sent via radio resource control signalling.

14. The method of claim 9, wherein when the many-to-one association exists, a beam used for transmitting the access response is different from any of the beams that map to the received PRACH.

15. The method of claim 14, wherein the beam comprises a wide, cell-covering, or approximately isotropic beam.

16. The method of claim 9, wherein the information transmitted to the wireless device indicates the many-to-one association exists between the downlink signal and the PRACH preamble indices, and wherein the downlink signal is transmitted according to a one-to-one association with the PRACH preamble indices.

17. The method of claim 9, further comprising:

configuring the transmitter to use the TX precoding weights when transmitting the access response, wherein the TX precoding weights are the same as TX precoding weights that were applied for transmitting the downlink signal indicated by the received PRACH preamble resources if the mapping between the downlink signal and the PRACH preamble indices comprises a one-to-one association.

18. A base station, comprising:

processing circuitry; and power supply circuitry configured to supply power to the network node; wherein the processing circuitry is configured to:

transmit information to a wireless device, the information indicating whether a many-to-one association exists between (a) a downlink signal that the wireless device-uses for beam selection prior to a random access procedure, and (b) physical random access channel (PRACH) preamble indices;

transmit one or more of the downlink signals that the wireless device uses for beam selection prior to the random access procedure;

receive a PRACH preamble from the wireless device;

apply a transmitter configuration for transmitting an access response to the received PRACH preamble, the transmitter configuration based at least in part on whether the many-to-one association exists and on the received PRACH preamble, wherein applying the transmitter configuration comprises configuring the transmitter to use TX precoding weights, when transmitting the access response, that focus the access response energy in a direction of the PRACH preamble reception if the mapping between the downlink signal and the PRACH preamble indices comprises the many-to-one association, wherein, when the many-to-one association exists between the downlink signal and the PRACH preamble indices, the transmitter configuration transmits with spatial correspondence between the access response and the received PRACH preamble, and wherein the spatial correspondence uses a preferred PRACH settings to configure the access response transmission.

\* \* \* \* \*